(12) United States Patent
Knepper

(10) Patent No.: US 9,052,976 B2
(45) Date of Patent: Jun. 9, 2015

(54) METHODS, APPARATUSES AND COMPUTER PROGRAM PRODUCTS FOR FACILITATING EFFICIENT DEPLOYMENT OF SOFTWARE

(75) Inventor: Max Knepper, Peosta, IA (US)

(73) Assignee: McKesson Financial Holdings, Hamilton (BM)

( * ) Notice: Subject to any disclaimer, the term of this patent is extended or adjusted under 35 U.S.C. 154(b) by 528 days.

(21) Appl. No.: 12/941,795

(22) Filed: Nov. 8, 2010

(65) Prior Publication Data

US 2012/0117532 A1 May 10, 2012

(51) Int. Cl.
*G06F 9/445* (2006.01)

(52) U.S. Cl.
CPC ... *G06F 8/60* (2013.01); *G06F 8/61* (2013.01)

(58) Field of Classification Search
CPC .............. G06F 8/60; G06F 8/61; G06F 8/63; G06F 8/65; G06F 8/665; G06F 8/70; G06F 8/71
USPC .................................................. 717/101–178
See application file for complete search history.

(56) References Cited

U.S. PATENT DOCUMENTS

| | | | | |
|---|---|---|---|---|
| 6,199,204 B1 * | 3/2001 | Donohue | ..................... | 717/178 |
| 6,742,175 B1 * | 5/2004 | Brassard | ........................ | 717/107 |
| 7,398,480 B2 * | 7/2008 | Zimniewicz et al. | ......... | 715/841 |
| 7,665,061 B2 * | 2/2010 | Kothari et al. | ................ | 717/106 |
| 7,716,240 B2 * | 5/2010 | Lim | .............................. | 707/781 |
| 7,752,559 B1 * | 7/2010 | Szpak et al. | ................... | 715/764 |
| 7,797,676 B2 * | 9/2010 | Agapi et al. | ................... | 717/109 |
| 7,849,440 B1 * | 12/2010 | Englehart | ..................... | 717/106 |
| 8,051,405 B2 * | 11/2011 | Komissarchik et al. | ....... | 717/115 |
| 8,074,214 B2 * | 12/2011 | Isaacson et al. | ............... | 717/173 |
| 8,321,300 B1 * | 11/2012 | Bockius et al. | ............... | 705/27.1 |
| 8,458,098 B1 * | 6/2013 | Scardino | .......................... | 705/57 |
| 2002/0073057 A1 * | 6/2002 | Benoit et al. | ...................... | 707/1 |
| 2002/0124245 A1 * | 9/2002 | Maddux et al. | ............... | 717/176 |
| 2004/0044999 A1 * | 3/2004 | Gibson | ........................... | 717/178 |
| 2004/0060035 A1 * | 3/2004 | Ustaris | .......................... | 717/100 |
| 2004/0205696 A1 * | 10/2004 | Chupa et al. | ................... | 717/106 |
| 2004/0230945 A1 * | 11/2004 | Bryant et al. | .................. | 717/106 |
| 2004/0237084 A1 * | 11/2004 | Kurzweil et al. | ............. | 717/178 |
| 2004/0255291 A1 * | 12/2004 | Sierer et al. | ................... | 717/174 |
| 2005/0044531 A1 * | 2/2005 | Chawla et al. | ................ | 717/122 |
| 2005/0114672 A1 * | 5/2005 | Duncan et al. | ................ | 713/182 |
| 2005/0132349 A1 * | 6/2005 | Roberts et al. | ................ | 717/168 |
| 2005/0265247 A1 * | 12/2005 | Bourke-Dunphy et al. | .. | 370/249 |
| 2007/0022405 A1 * | 1/2007 | Bray | .............................. | 717/106 |
| 2007/0157192 A1 * | 7/2007 | Hoefler et al. | ................ | 717/168 |
| 2007/0294420 A1 * | 12/2007 | Mohindra et al. | ............ | 709/230 |
| 2008/0052701 A1 * | 2/2008 | Abernethy et al. | ........... | 717/170 |
| 2008/0168437 A1 * | 7/2008 | Chen et al. | .................... | 717/176 |

(Continued)

*Primary Examiner* — Lewis A Bullock, Jr.
*Assistant Examiner* — Francisco Aponte
(74) *Attorney, Agent, or Firm* — Alston & Bird LLP

(57) ABSTRACT

An apparatus is provided for enabling deployment of software code within one or more environments in an efficient and reliable manner. The apparatus includes a processor configured to receive a first selection of software code built by a device and automatically deploy the software code within a first environment in response to receipt of a second selection. The processor is also configured to enable installation of the software code to one or more devices that support the first environment and deploy the software code to a second environment in response to receipt of an indication that the software code deployed within the first environment is completed and approved. Corresponding computer program products and methods are also provided.

18 Claims, 22 Drawing Sheets

(56) References Cited

U.S. PATENT DOCUMENTS

| | | |
|---|---|---|
| 2008/0229279 A1* | 9/2008 | Richmond .................... 717/106 |
| 2009/0019377 A1* | 1/2009 | Chen et al. .................... 715/758 |
| 2009/0089777 A1* | 4/2009 | Fuller et al. .................... 717/174 |
| 2009/0094592 A1* | 4/2009 | Alam et al. .................... 717/168 |
| 2009/0157426 A1* | 6/2009 | Malec et al. ...................... 705/3 |
| 2010/0064171 A1* | 3/2010 | How et al. ........................ 714/15 |
| 2010/0122235 A1* | 5/2010 | Betawar et al. ............... 717/106 |
| 2010/0125827 A1* | 5/2010 | Francis et al. ................ 717/109 |
| 2010/0131084 A1* | 5/2010 | Van Camp ...................... 700/86 |
| 2010/0242037 A1* | 9/2010 | Xie et al. ....................... 717/178 |
| 2011/0047540 A1* | 2/2011 | Williams et al. .............. 717/178 |
| 2013/0247027 A1* | 9/2013 | Shah et al. .................... 717/177 |

\* cited by examiner

METHODS, APPARATUSES AND COMPUTER PROGRAM PRODUCTS FOR FACILITATING EFFICIENT DEPLOYMENT OF SOFTWARE

TECHNOLOGICAL FIELD

Embodiments of the invention relate generally to mechanisms of more efficiently deploying software and, more particularly, relate to a method, apparatus and computer program product for automating the process of deploying software within one or more environments.

BACKGROUND

Advances in processor, networking and other related technologies have led to increased networked computing and abundant availability of content on private and public networks. Users may access the available content from electronic devices remote from the content storage and interact with content using their local electronic device. A particularly relevant example is software deployment, in which servers may deploy software for usage by one or more electronic devices. In this regard, the servers may build the software code (e.g., an artifact(s)) that is to be deployed into different environments such as, for example, development, production, or quality assurance environments. At present, problems may exist in the software deployment process because typically each software system is unique and the precise procedures for activities relating to deployment may not be uniform. In this regard, problems may arise when one person associated with the deployment process performs procedures in a different fashion from another person.

Additionally, as software development processes and resources become more distributed, the software development process may be more complex, which may cause issues since there are typically many pieces of information that need to mesh together seamlessly to enable successful deployment. With a number of different systems and environments, it may be difficult to identify the software that has been deployed to a particular environment(s). For instance, when code (e.g., software) is deployed into different environments there may be issues related to tracking or identifying relevant information such as, for example, tracking the code (e.g., versions) that went into each environment, identifying what was in each release of the code, identifying who deployed the code to certain environments during the software application lifecycle, identifying where artifacts are stored for a given environment so that the artifacts may be moved to another environment. Currently, this information typically has to be tracked and identified by performing manual processes of searching for the information. For example, in order to identify when or who deployed the software, a user may have to manually log into different systems and view different versions, file sizes, and dates associated with the deployed software as well as manually download files from one or more servers. In this regard, there may be a need for a system that is a capable of maintaining and storing auditing data to enable identification of information as to whom and when the software was deployed to an environment.

Additionally, manually searching for information associated with the deployment of software may be time consuming, burdensome and inefficient. Also, there may be a need to automatically integrate the process of deploying software code from one environment to the next such that it is a repeatable uniform process that may be utilized in a simple, efficient and reliable manner by different individuals who may be involved in the deployment process.

In view of the foregoing problems, it may be desirable to remove the variation and manual process associated with deploying software through an application lifecycle. As such, in view of the foregoing drawbacks, it may be desirable to provide a mechanism that efficiently and reliably deploys software in an automated manner.

BRIEF SUMMARY

A method, apparatus and computer program product are therefore provided that enable deployment of software code within one or more environments in an efficient and reliable manner. By utilizing the exemplary embodiments, a user(s) may have the ability to deploy software code in a user friendly and efficient manner via a selection(s) of an input (e.g., button, tab or the like). For instance, in response to selections of inputs, software code may be retrieved from devices and deployed within environments in an automated manner. In this regard, an exemplary embodiment may eliminate or remove the variation and the manual process of moving files and executing scripts in order to deploy software through the application lifecycle which is typical of conventional approaches.

According to an exemplary embodiment, users may be able to utilize a user interface to select a software build and select an input to begin the process of deploying software. When a first deployment has completed, the exemplary embodiments may facilitate deployment of the software code into second and subsequent configured environments and in this regard the deployment process can be repeated for a configured number of environments until the software code is deployed within a final environment of an application lifecycle.

In one exemplary embodiment, a method for enabling deployment of software code within one or more environments in an efficient and reliable manner is provided. The method may include receiving a first selection of software code built by a device and automatically deploying the software code within a first environment in response to receipt of a second selection. The method may further include enabling installation of the software code to one or more devices that support the first environment and deploying the software code to a second environment in response to receipt of an indication that the software code deployed within the first environment is completed and approved.

In another exemplary embodiment, an apparatus for enabling deployment of software code within one or more environments in an efficient and reliable manner is provided. The apparatus includes a processor configured to receive a first selection of software code built by a device and automatically deploy the software code within a first environment in response to receipt of a second selection. The processor may also enable installation of the software code to one or more devices that support the first environment and deploy the software code to a second environment in response to receipt of an indication that the software code deployed within the first environment is completed and approved.

In yet another exemplary embodiment, a computer program product for enabling deployment of software code within one or more environments in an efficient and reliable manner is provided. The computer program product may include at least one computer-readable storage medium having computer-executable program code instructions stored therein. The computer-executable program code instructions may include program code instructions configured to cause receipt of a first selection of software code built by a device and automatically deploy the software code within a first environment in response to receipt of a second selection. The program code instructions may enable installation of the software code to one or more devices that support the first environment and deploy the software code to a second environment in response to receipt of an indication that the software code deployed within the first environment is completed and approved.

Embodiments of the invention may provide a method, apparatus and computer program product for enabling an efficient and reliable manner in which to deploy software code within one or more environments. As a result, communication device users may enjoy an improved experience when deploying software code throughout an application lifecycle.

BRIEF DESCRIPTION OF THE SEVERAL VIEWS OF THE DRAWINGS

Figure 1:
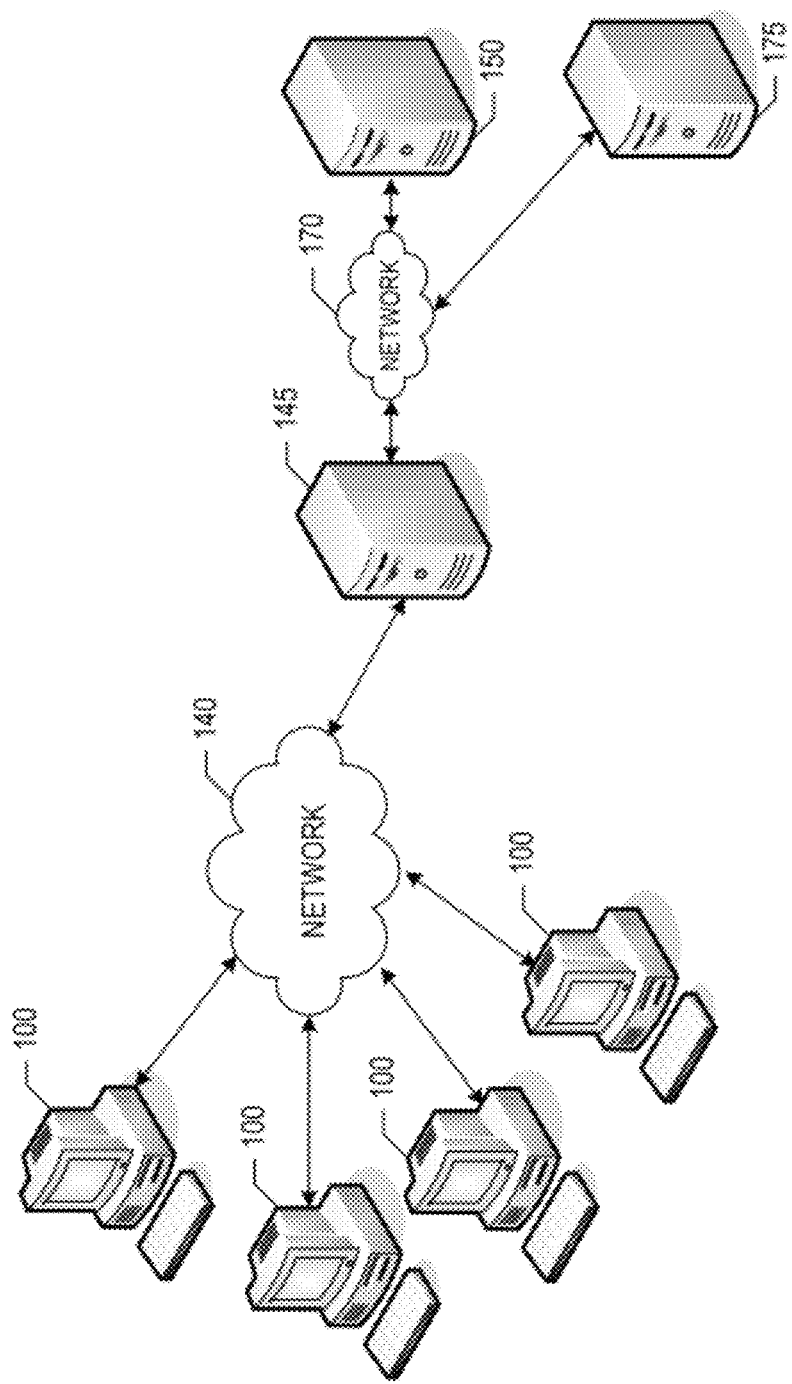
Figure 2:
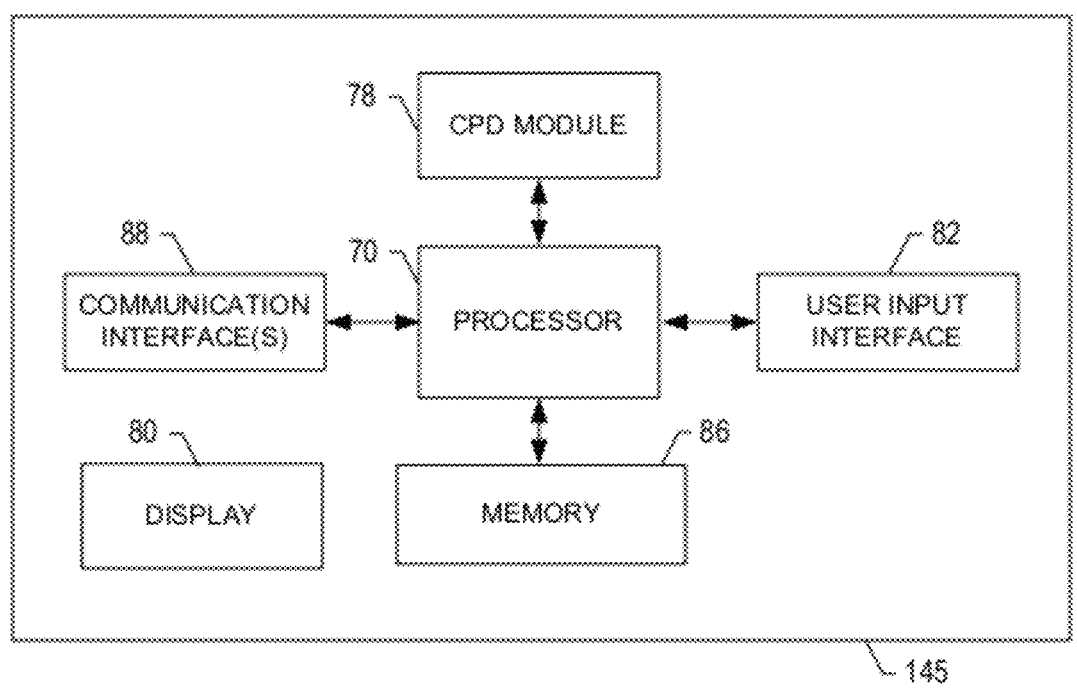
Figure 3:
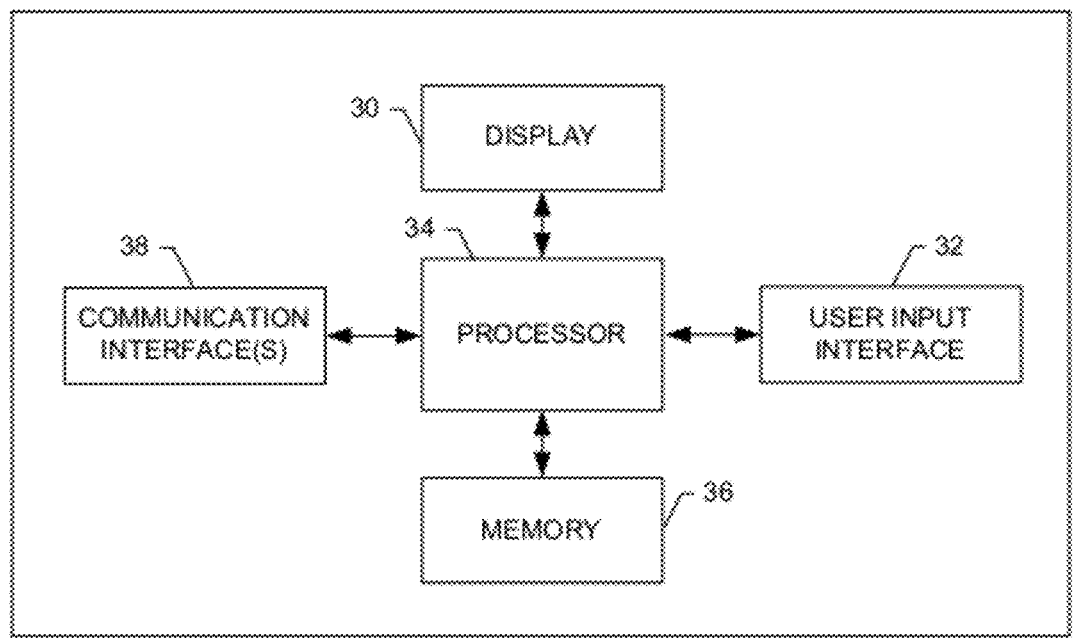
Figure 4:
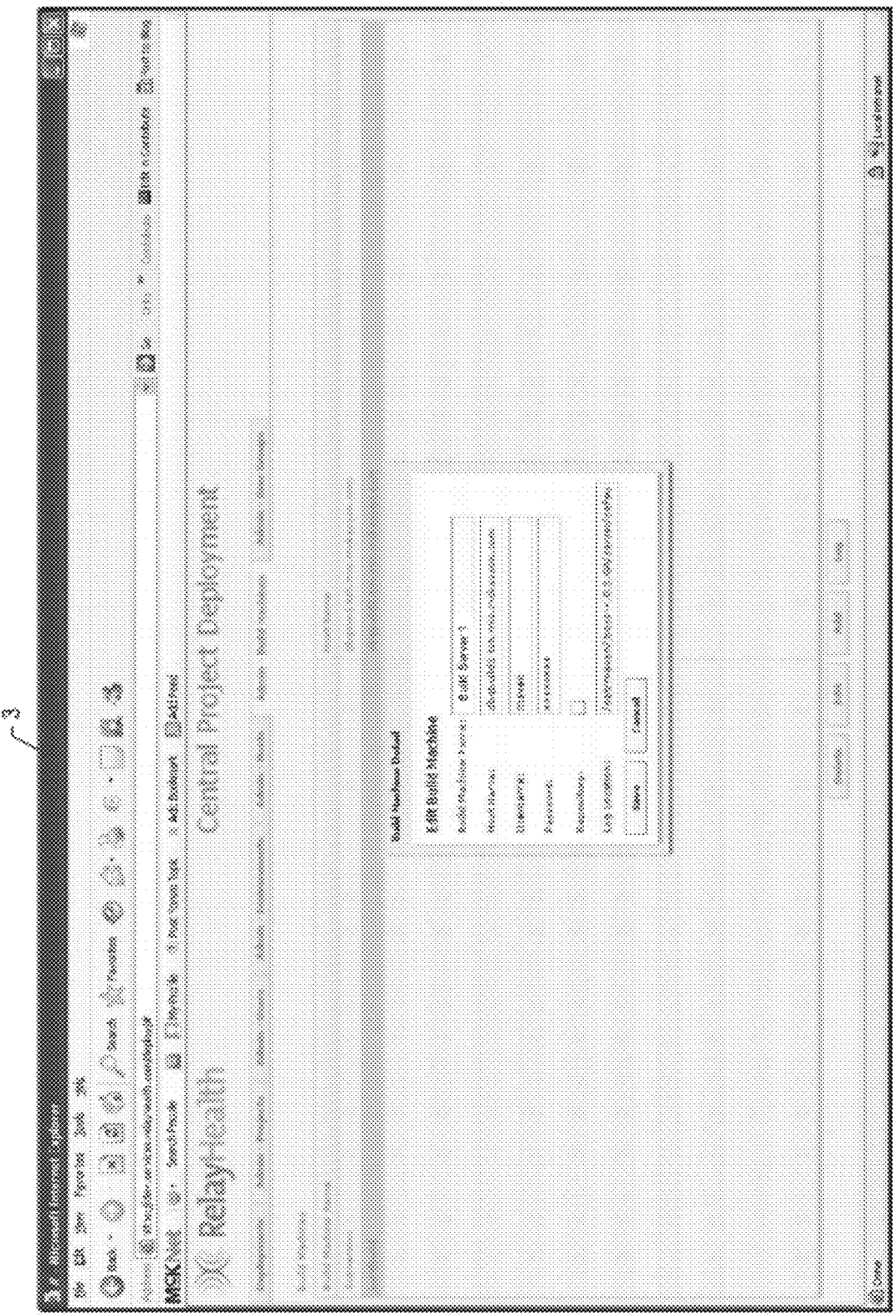
Figure 5:
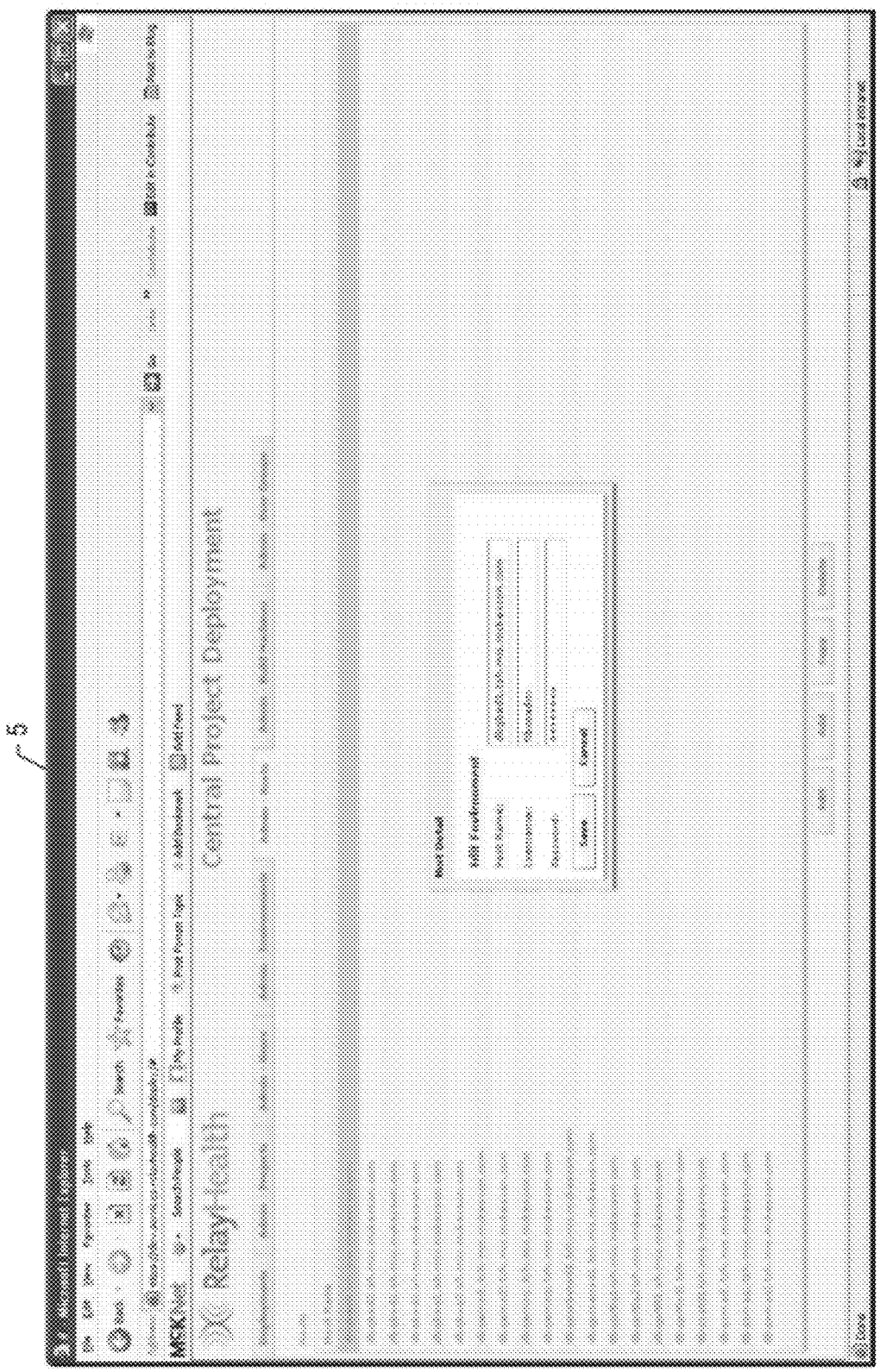
Figure 6:
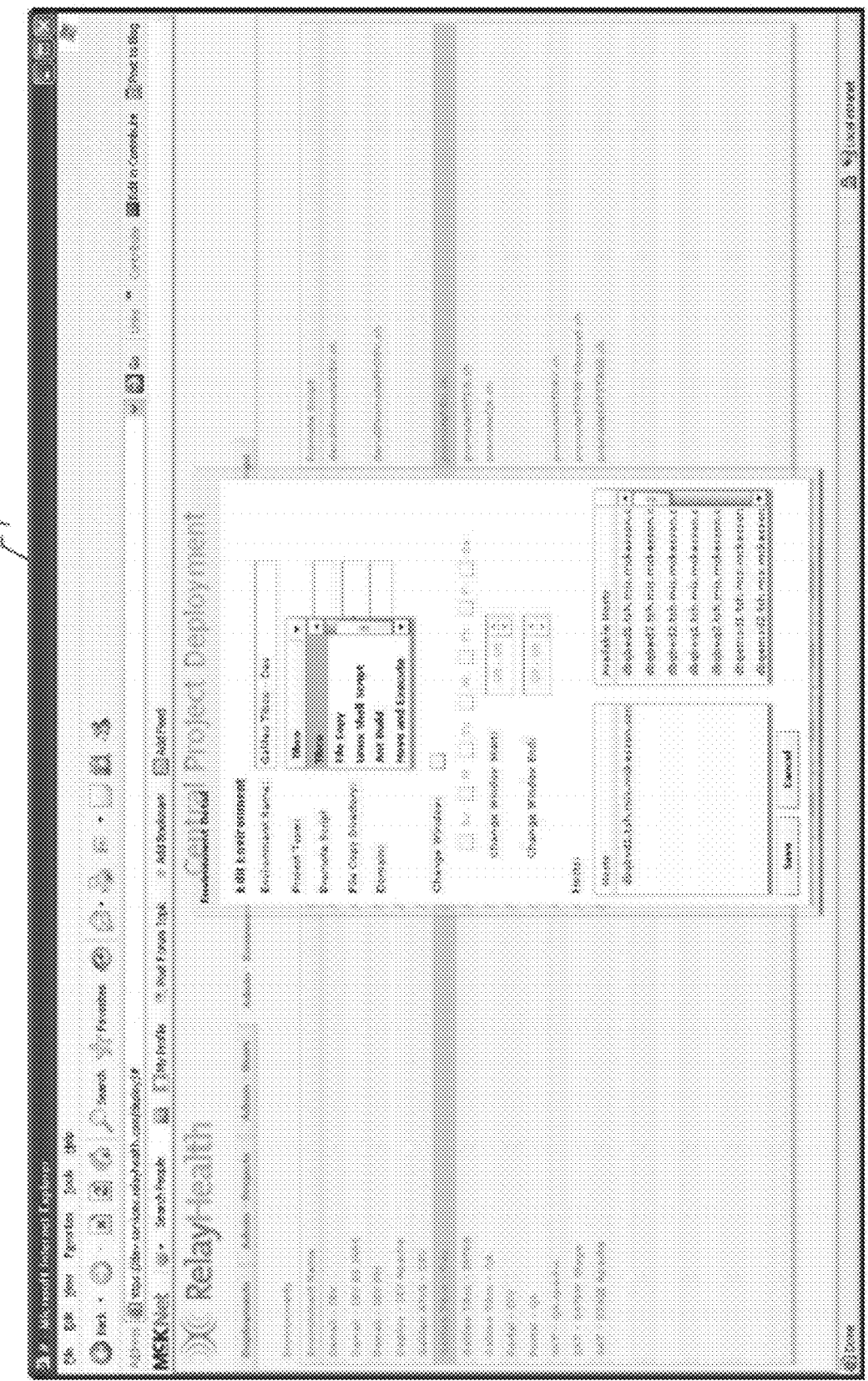
Figure 7:
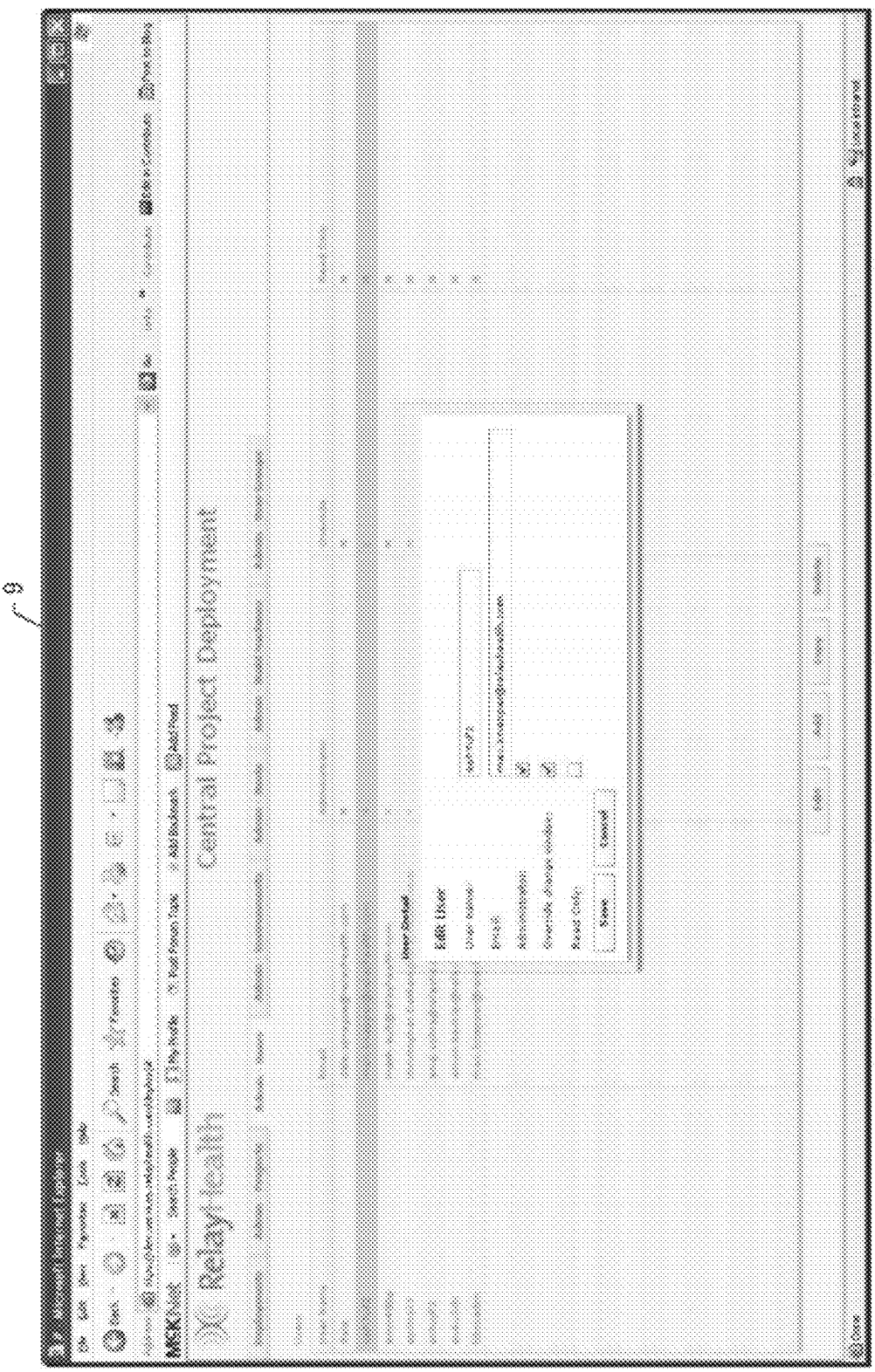
Figure 8:
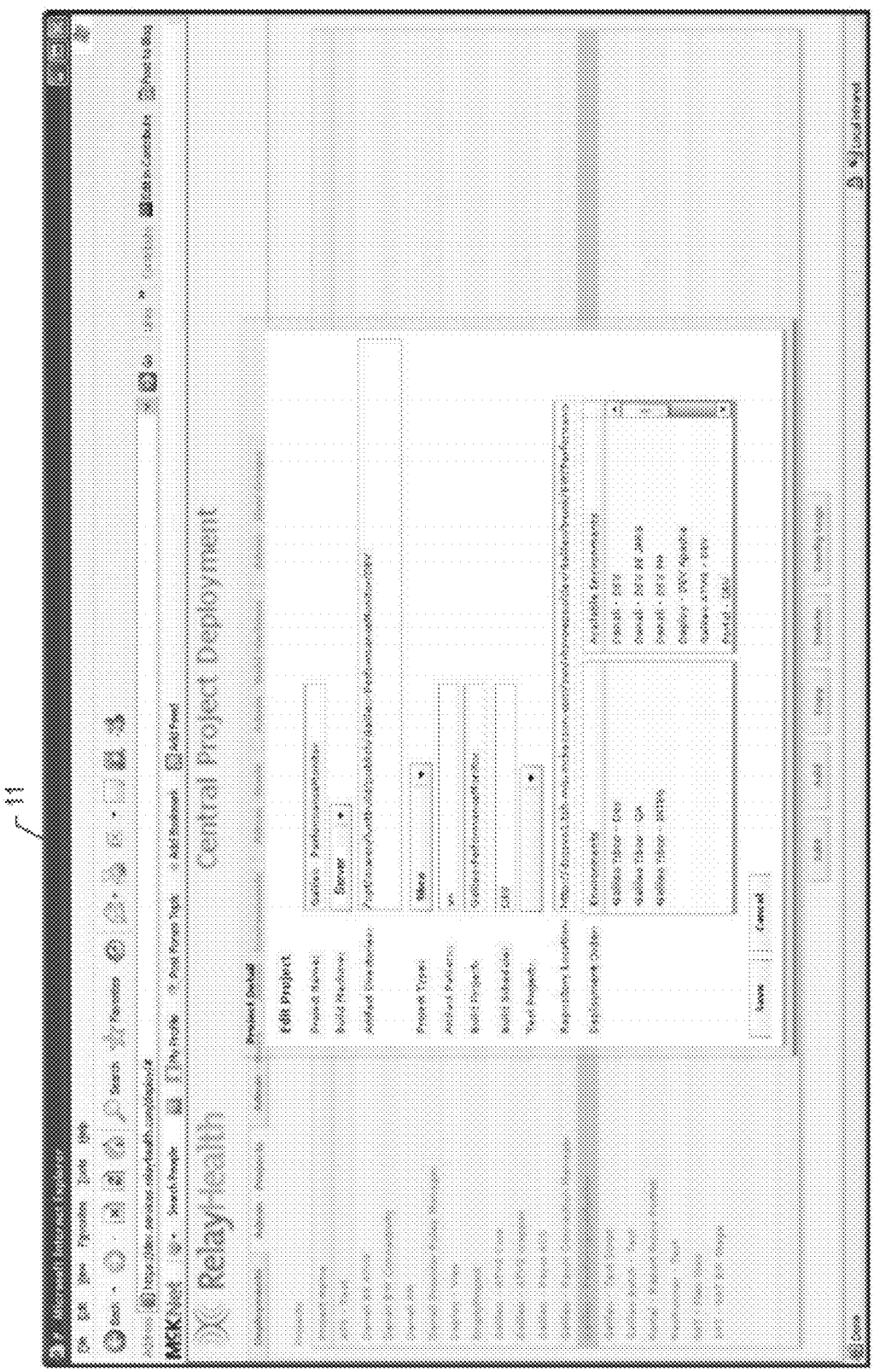
Figure 9:
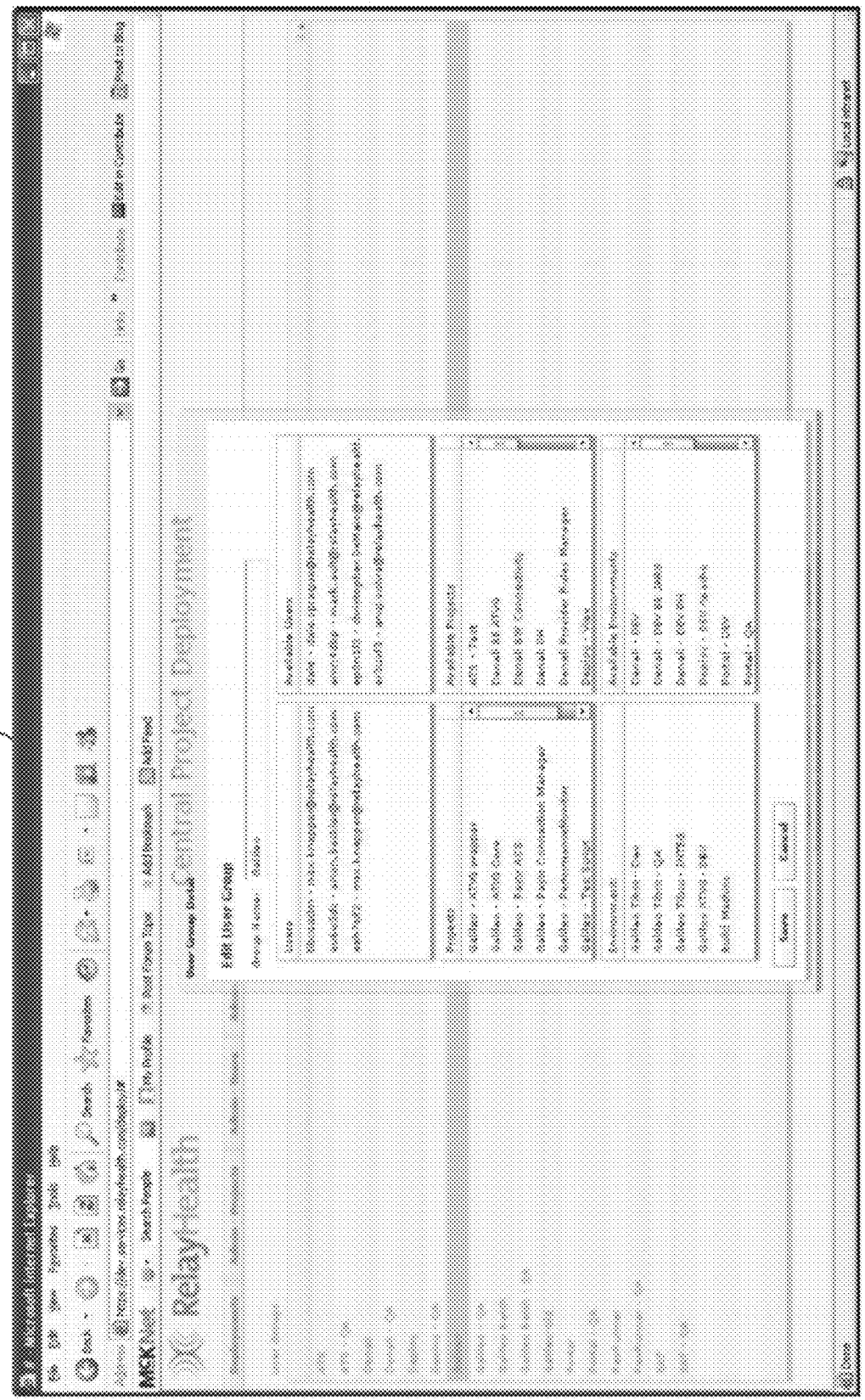
Figure 10:
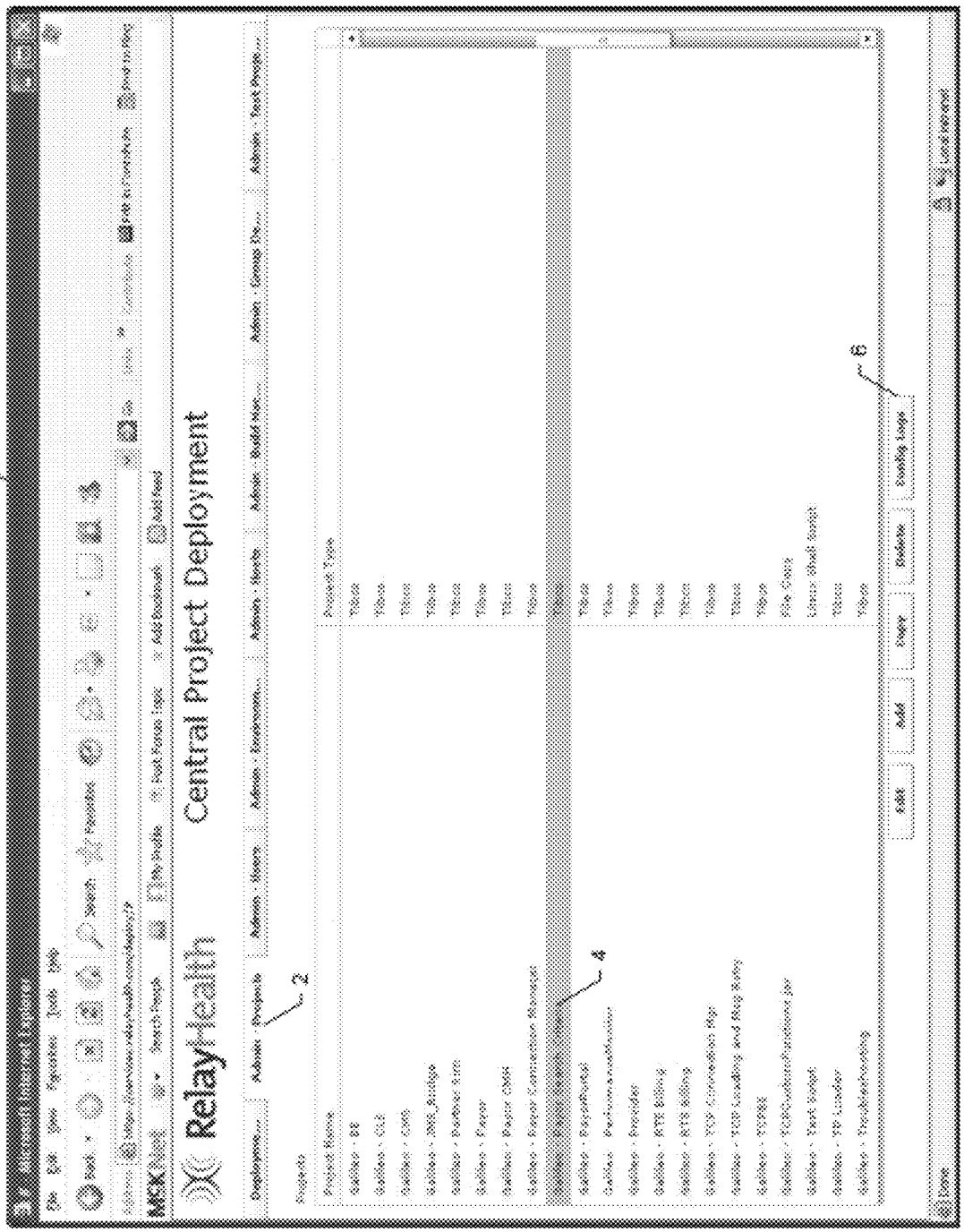
Figure 11:
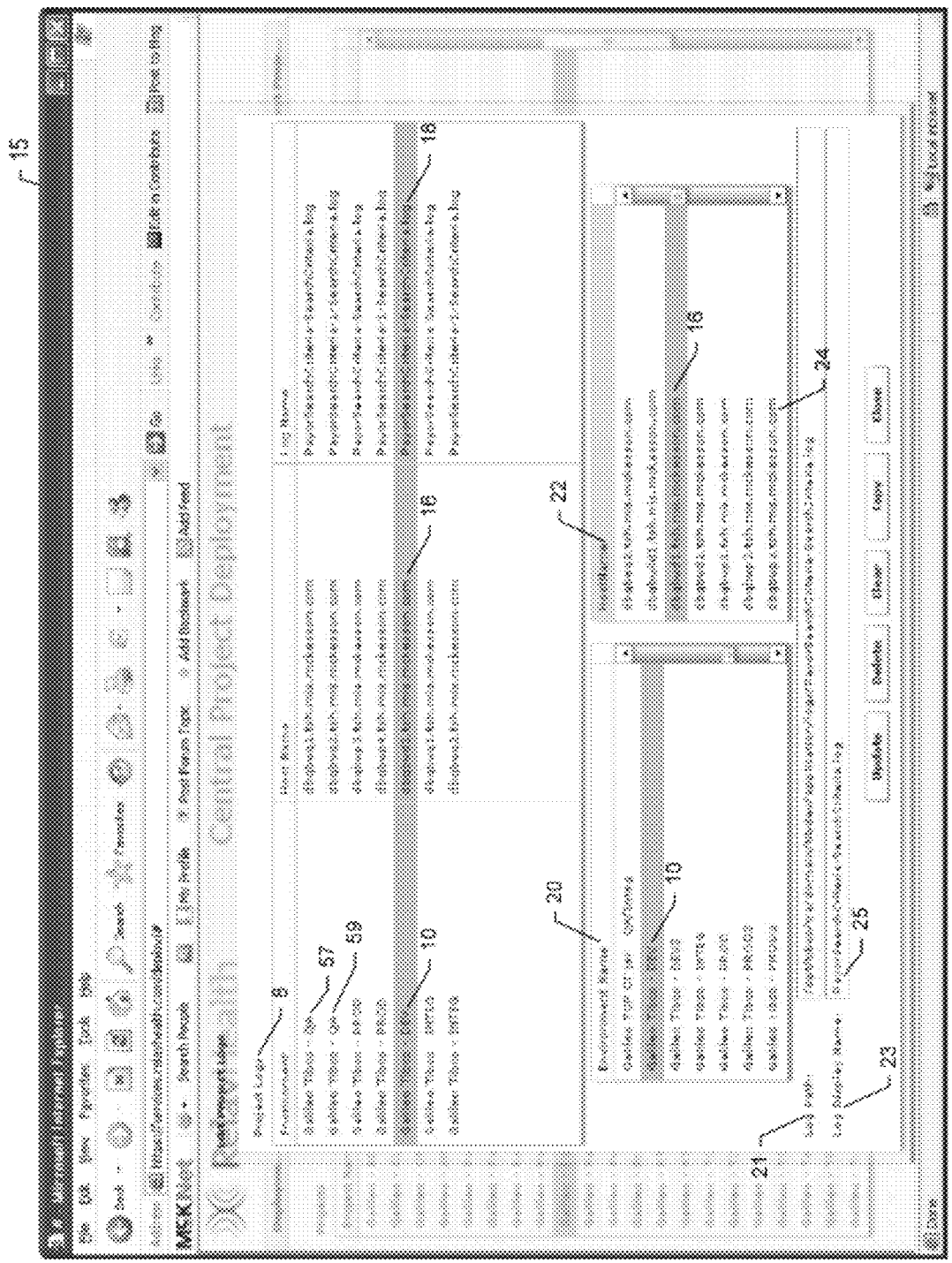
Figure 12:
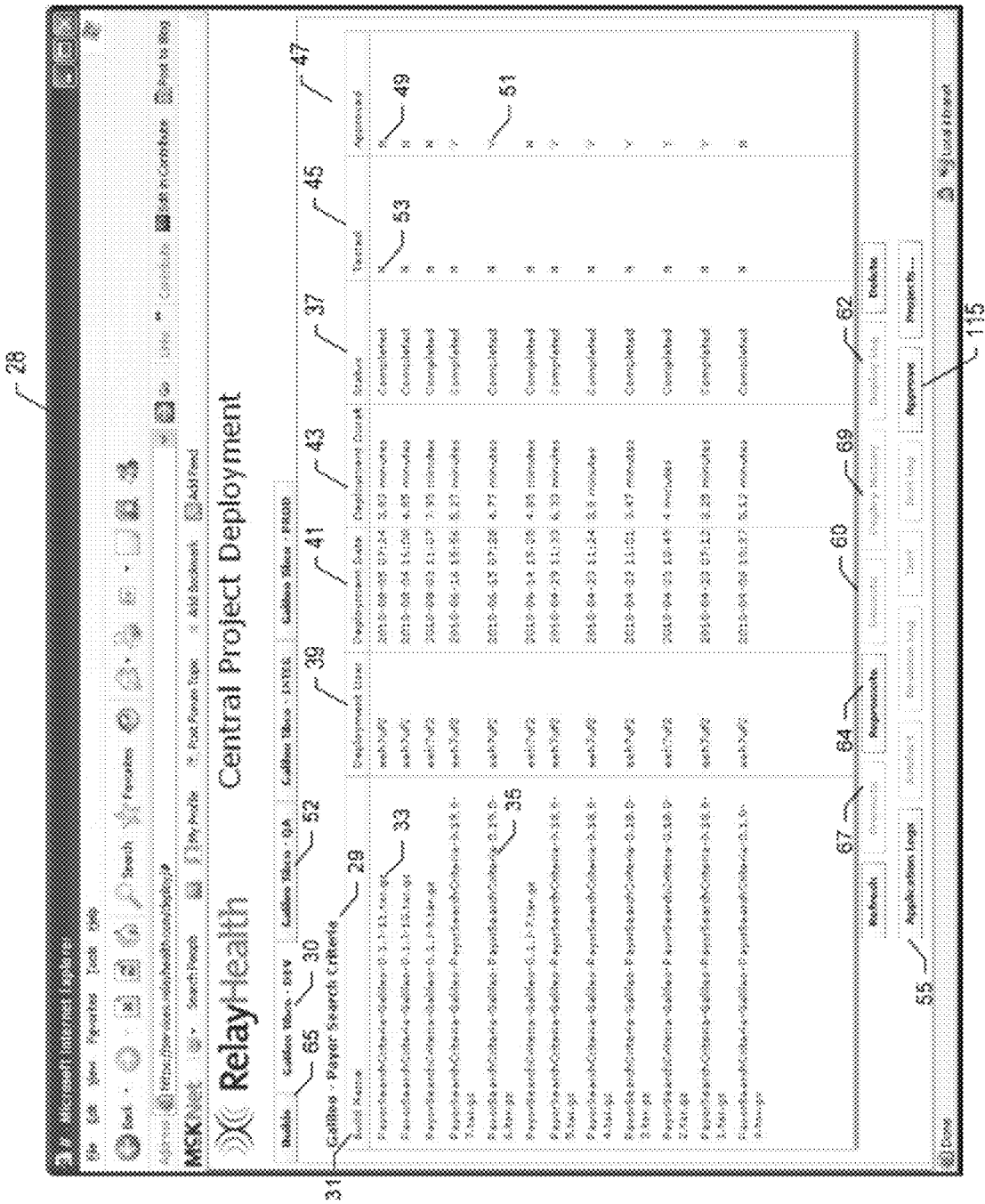
Figure 13:
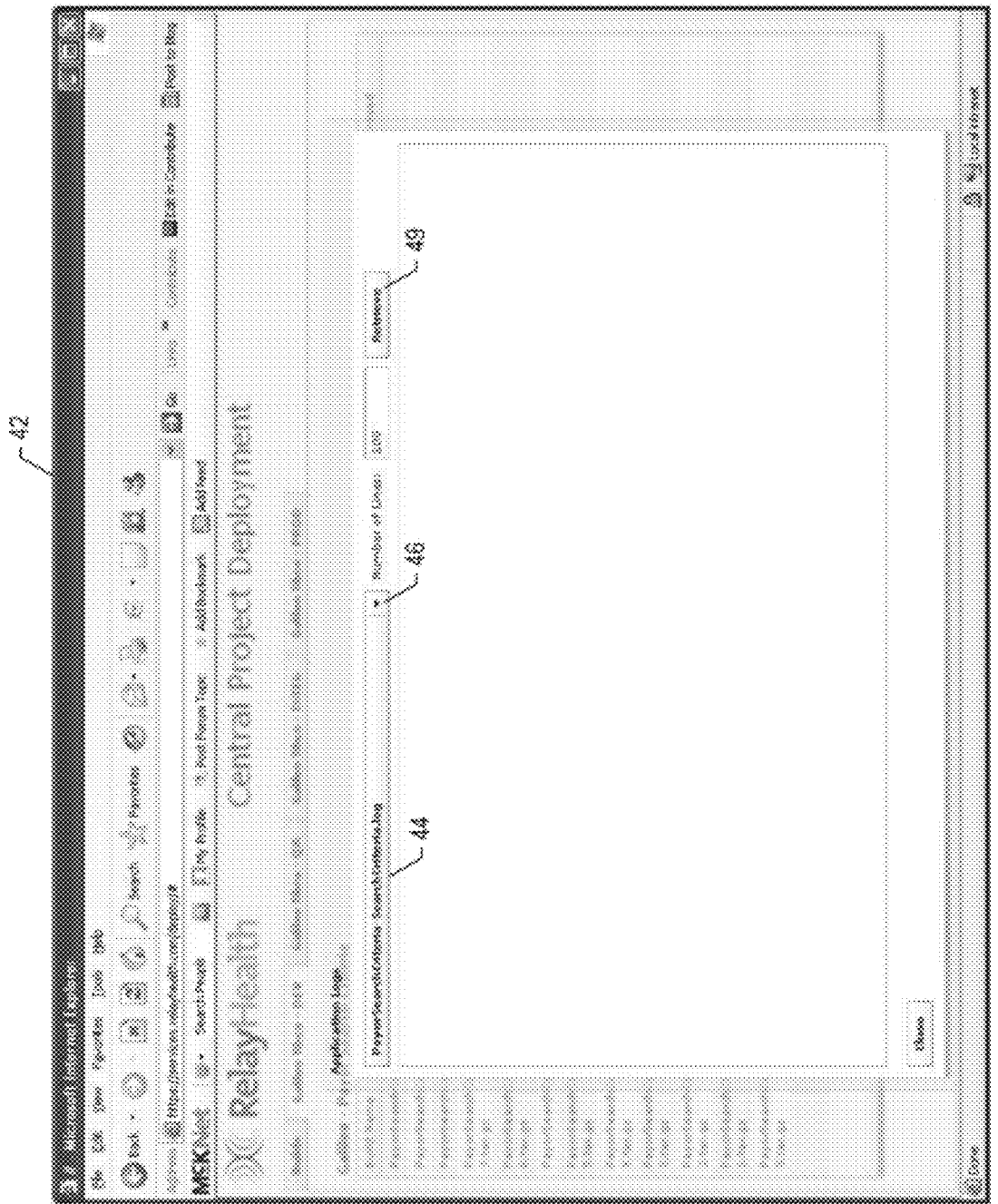
Figure 14:
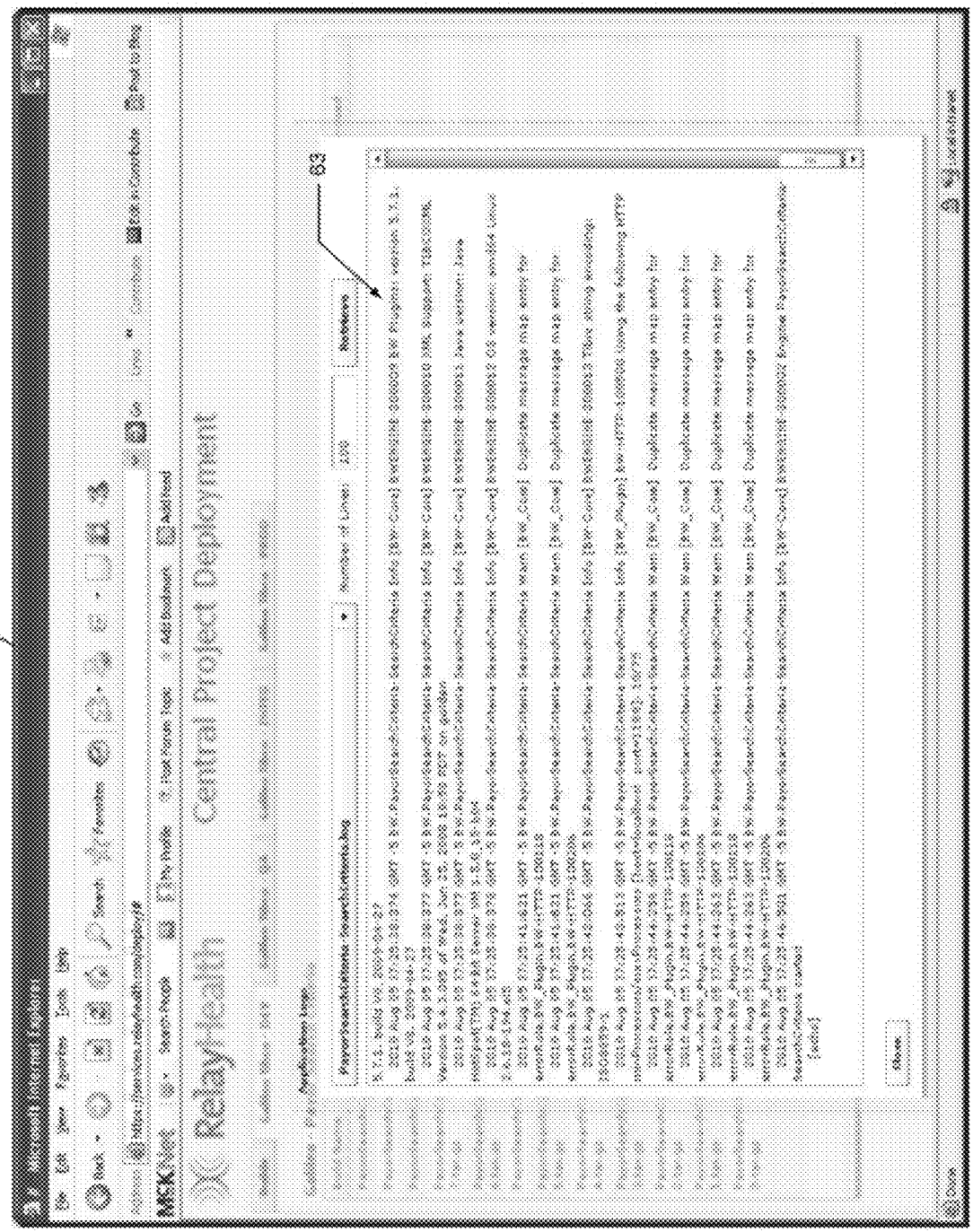
Figure 15:
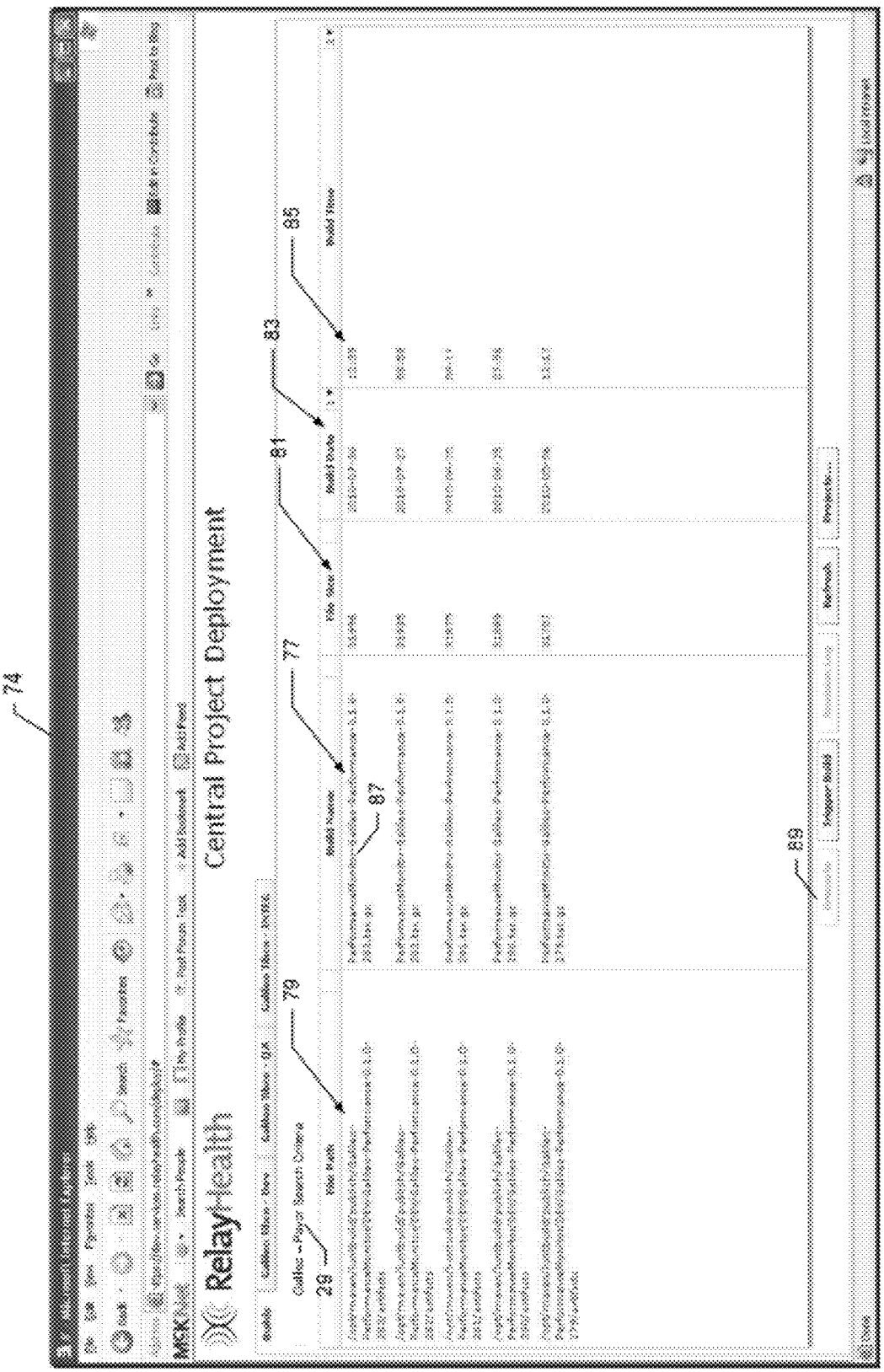
Figure 16:
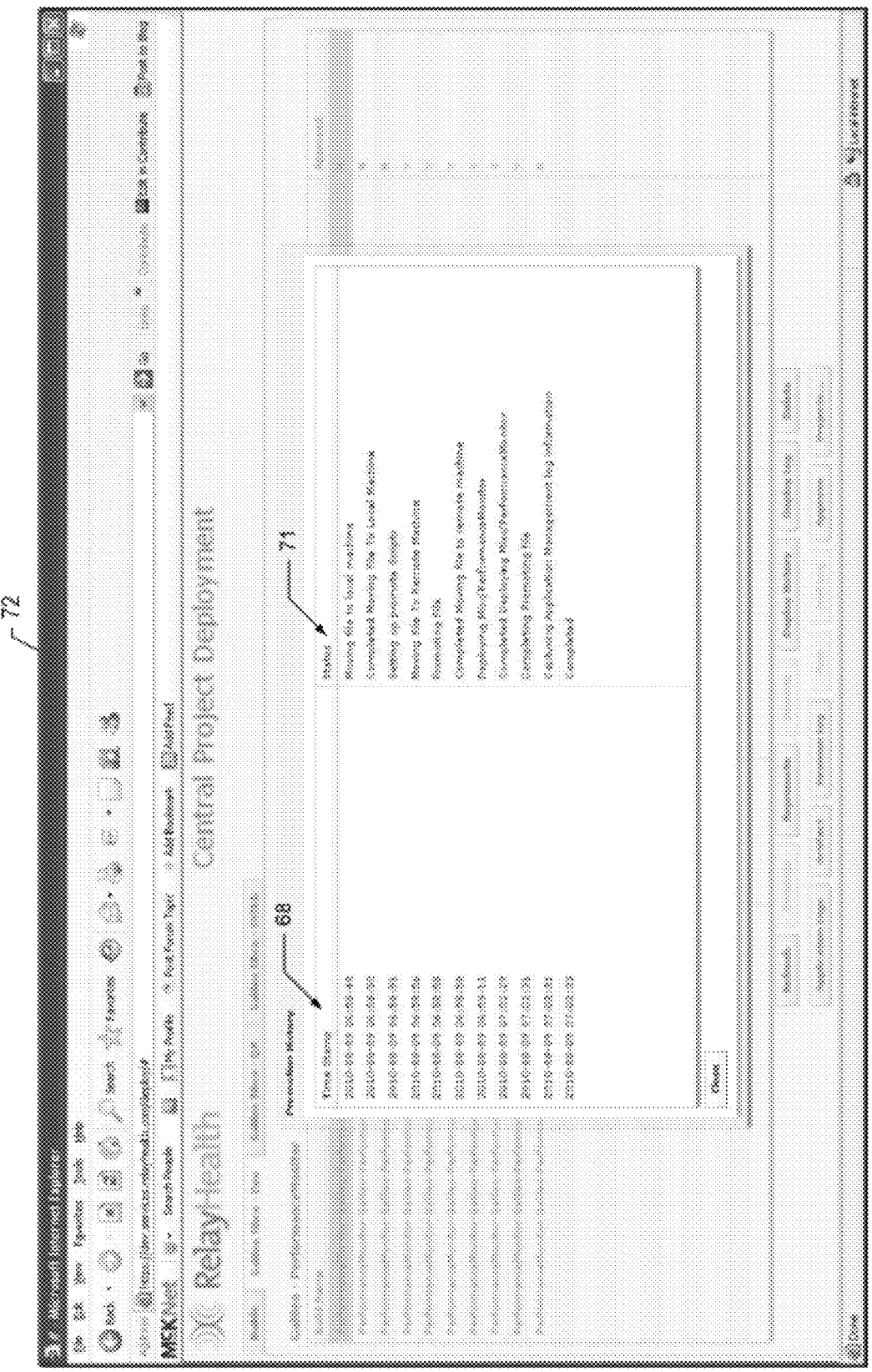
Figure 17:
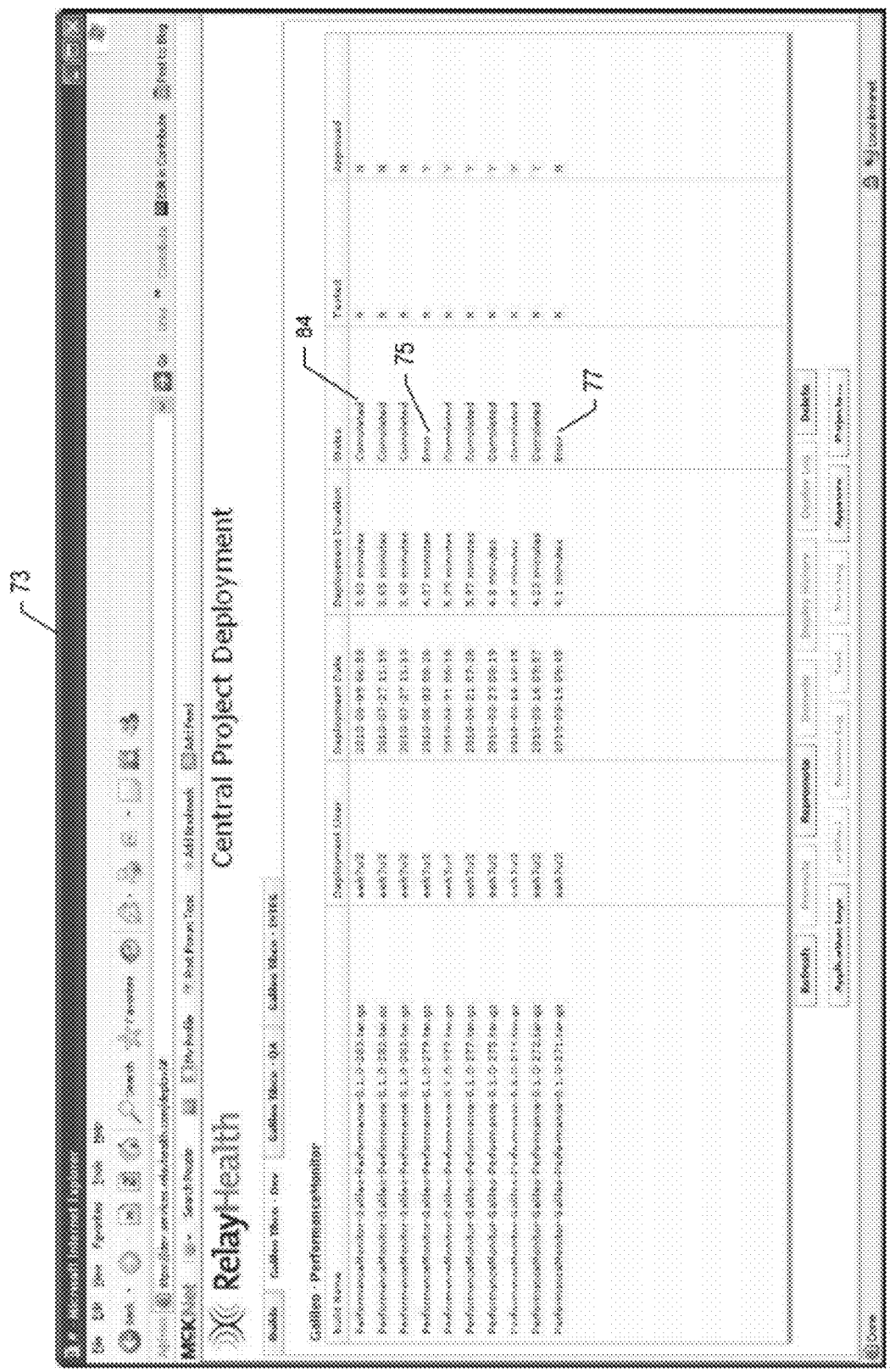
Figure 18A:
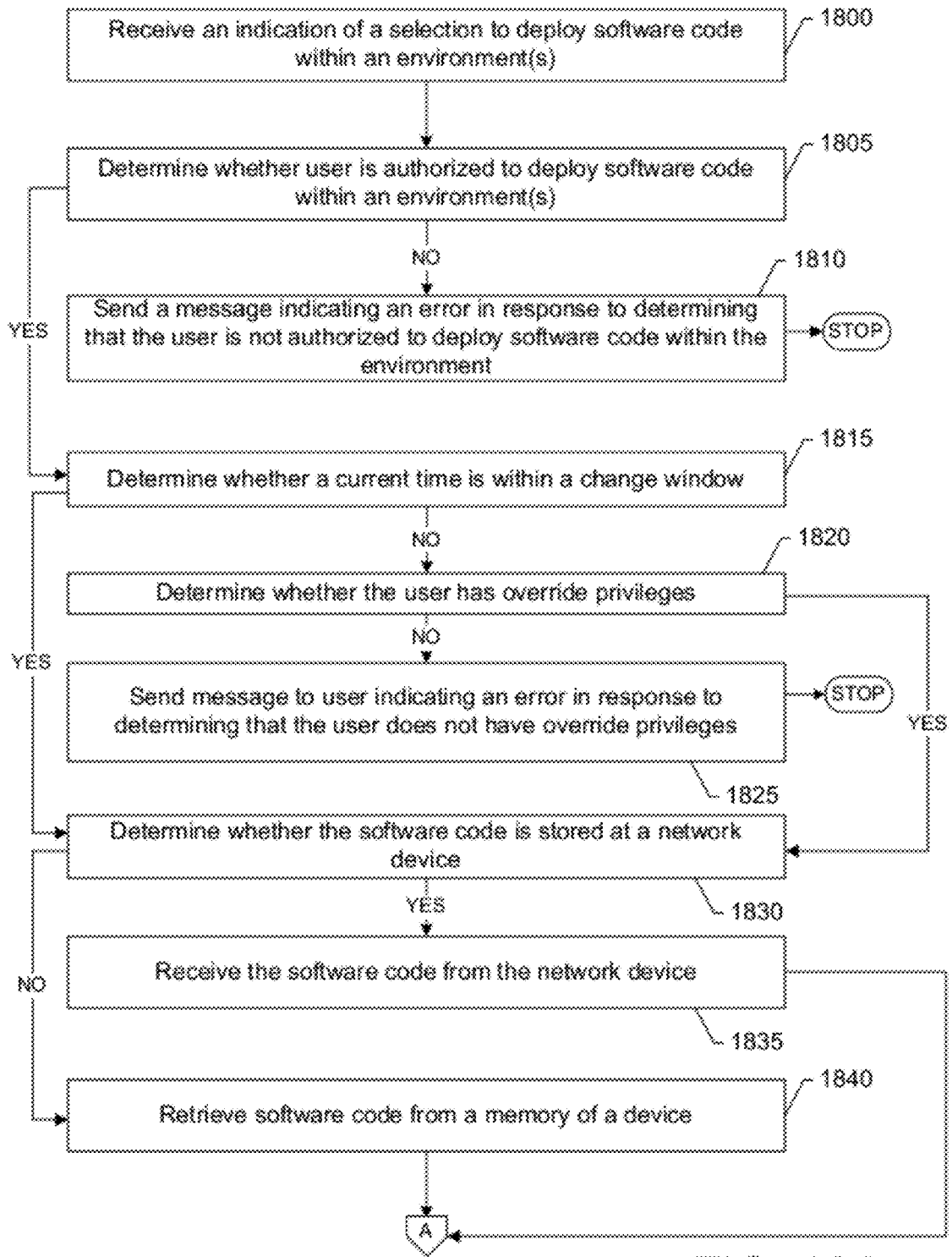
Figure 18B:
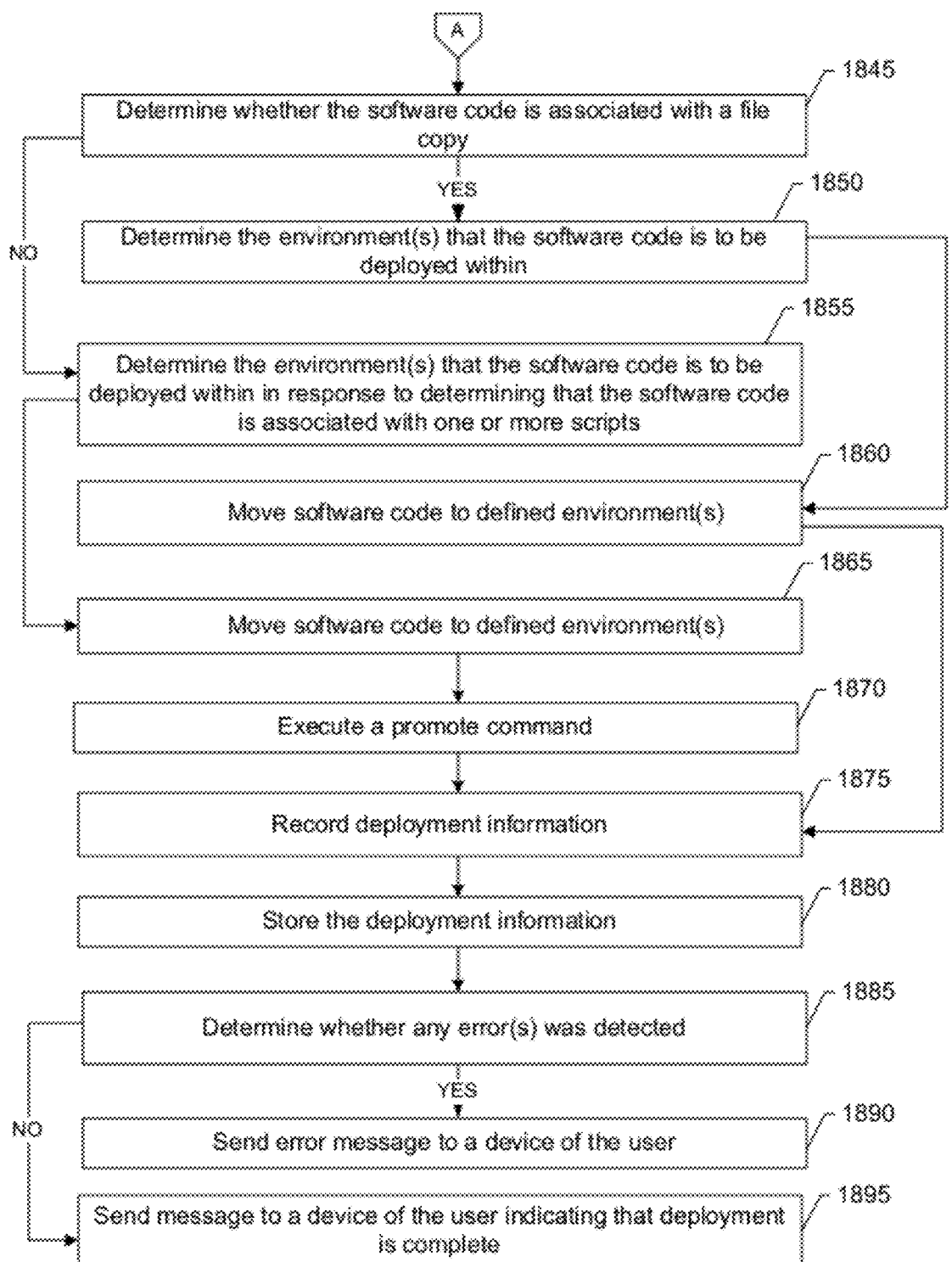
Figure 19:
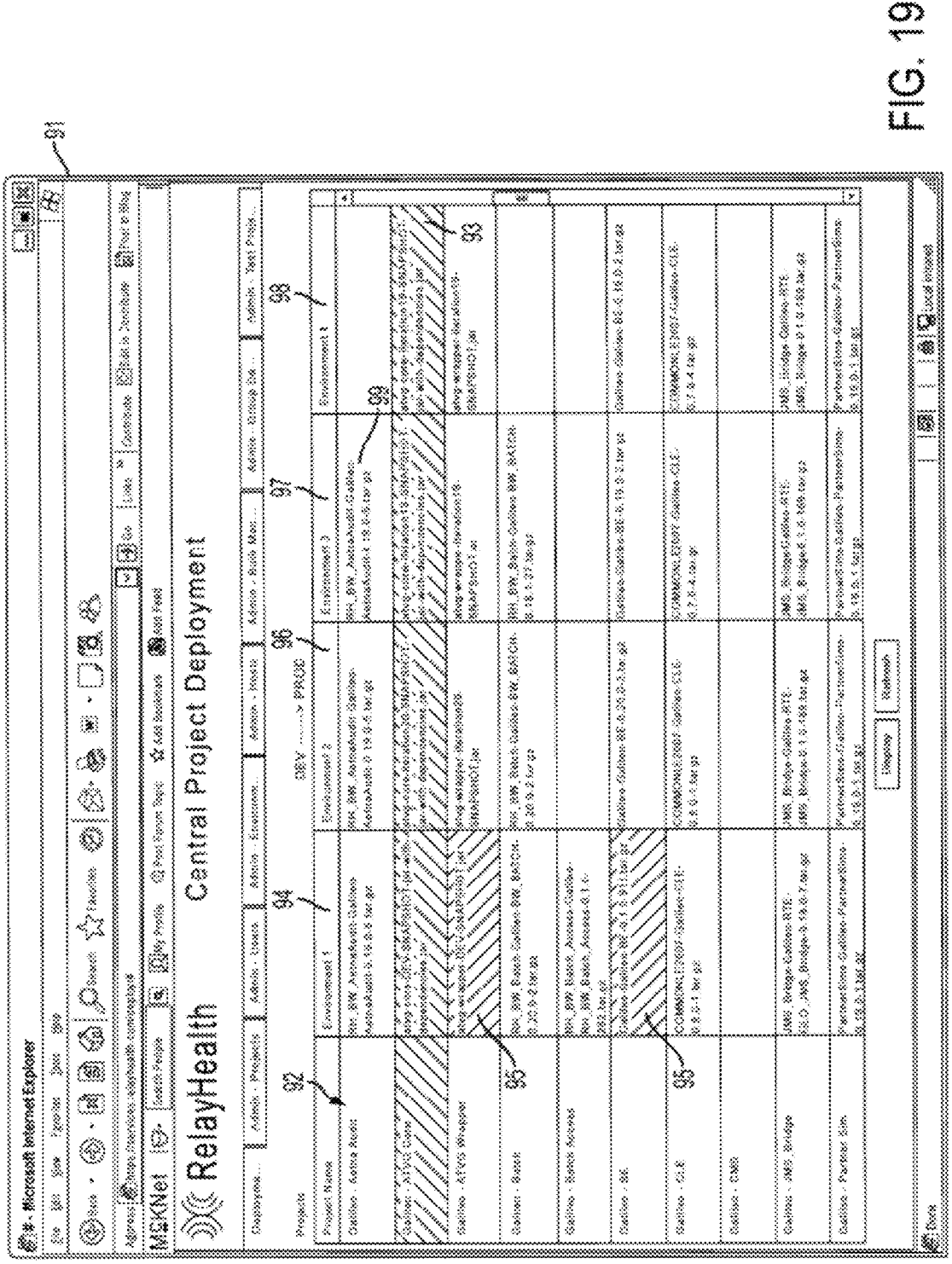
Figure 20:
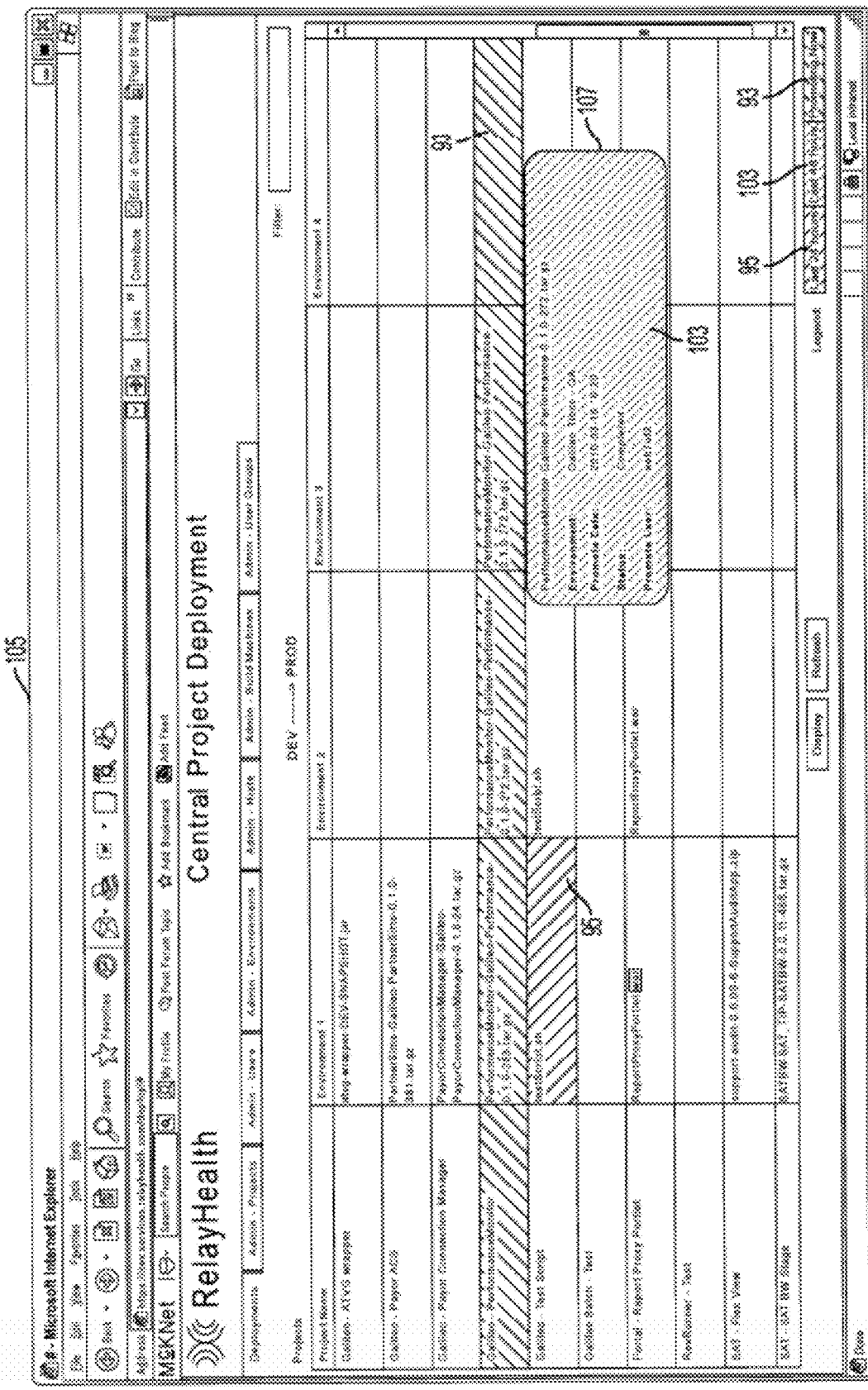
Figure 21:
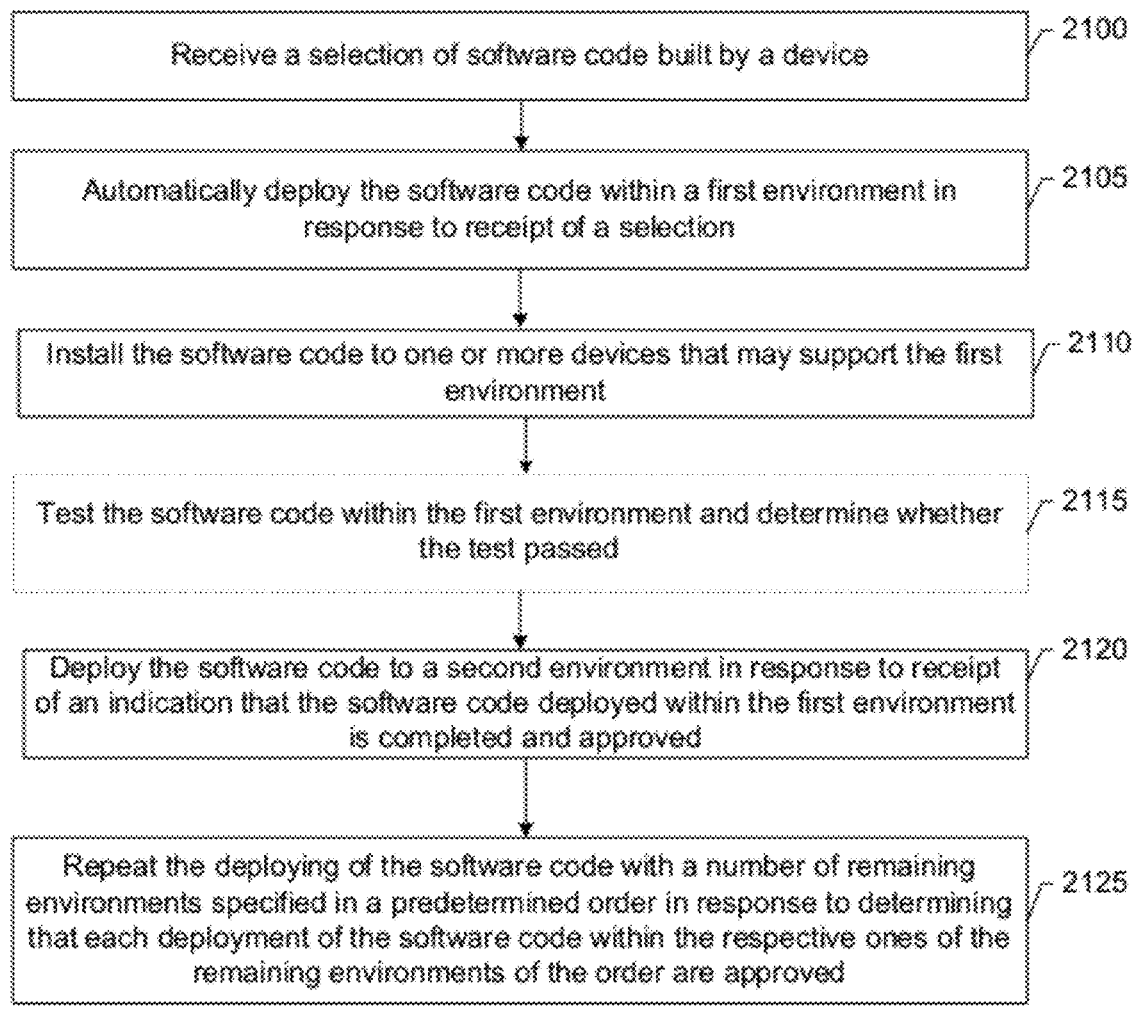

Having thus described the invention in general terms, reference will now be made to the accompanying drawings, which are not necessarily drawn to scale, and wherein:

FIG. 1 is a schematic block diagram of a system according to an exemplary embodiment of the invention;

FIG. 2 is a schematic block diagram of a communication device according to an exemplary embodiment of the invention;

FIG. 3 is a schematic block diagram of a computing device according to an exemplary embodiment of the invention;

FIG. 4 is a diagram of a user interface for editing and creating connections to devices according to an exemplary embodiment of the invention;

FIG. 5 is a diagram of a user interface for enabling editing of information associated with a device(s) corresponding to an environment according to an exemplary embodiment of the invention;

FIG. 6 is a diagram of a user interface for enabling setup of projects and environments according to an exemplary embodiment of the invention;

FIG. 7 is a diagram of a user interface for enabling creation and editing of rights associated with one or more users according to an exemplary embodiment of the invention;

FIG. 8 is a diagram of a user interface for enabling editing and addition of one or more projects within a system according to an exemplary embodiment of the invention;

FIG. 9 is a diagram of a user interface for assigning one or users to a group(s) according to an exemplary embodiment of the invention;

FIG. 10 is a diagram of a user interface for enabling display of one or more projects according to an exemplary embodiment of the invention;

FIG. 11 is a diagram of a user interface for enabling selection of one or more application logs according to an exemplary embodiment of the invention;

FIG. 12 is a diagram of a user interface for enabling selection of an application log(s) based on a deployment of software code within an environment according to an exemplary embodiment of the invention;

FIG. 13 is a diagram of a user interface for enabling display of one or more application logs corresponding to a selected project for an environment according to an exemplary embodiment of the invention;

FIG. 14 is a diagram of a user interface for enabling display of a portion of an application log(s) corresponding to a selected project for an environment according to an exemplary embodiment of the invention;

FIG. 15 is a diagram of a user interface for enabling display of one or more software builds generated by one or more devices according to an exemplary embodiment of the invention;

FIG. 16 is a diagram of a user interface for enabling display of one or more audit points and additional information according to an exemplary embodiment of the invention;

FIG. 17 is a diagram of a user interface for enabling display of one or more previous deployments of software code for a project(s) within an environment according to an exemplary embodiment of the invention;

FIGS. 18A & 18B are flowcharts of an exemplary method for deploying software code within an environment according to an exemplary embodiment of the invention;

FIG. 19 is a diagram of a user interface dashboard according to an exemplary embodiment of the invention;

FIG. 20 is a diagram of another user interface dashboard according to an exemplary embodiment of the invention; and FIG. 21 is a flowchart of an exemplary method for deploying software code within one or more environments according to an exemplary embodiment of the invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the invention. Moreover, the term "exemplary", as used herein, is not provided to convey any qualitative assessment, but instead merely to convey an illustration of an example. Thus, use of any such terms should not be taken to limit the spirit and scope of embodiments of the invention.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

Additionally, as used herein, the terms "software," "software code," "code," "computer software," "computer code," "application(s)," "program(s)," "computer program(s)" and similar terms may be used interchangeably to refer to data that provide instructions for execution by a computer, processor, microprocessor, controller or the like and may be deployed or promoted within one or more environments.

In addition, as referred to herein, the term "build(s)," "built (s)," "software build(s)," "software built(s)" or the like may refer to a process or procedure of building software code, applications, programs or the like. The software code may be built by a network device such as, for example, a server. When the network device builds software code, the software code may be referred to as a build.

As referred to herein, an "artifact(s)," may be software code that is packaged. The packaged code may be compiled source code that may be compiled by a network device that may build the code. The artifacts may be deployed within one or more environments. As used herein the term "artifact(s)" may be referred to interchangeably herein as "software," "software code," "code" or the like.

As referred to herein, the terms "promote" and "deploy" may be used interchangeably to refer to moving a selected build within one or more environments. Additionally, deploying or promoting the code or one or more artifacts may refer to installing the code/artifacts within an environment(s).

As referred to herein an "environment(s)" may be made up of or supported by one or more devices (e.g., servers). When software code is deployed within an environment it may be installed onto the devices supporting the environment. In this regard, the devices may work together to process or execute the installed software code to provide a solution or service.

General Overview

In general, according to various embodiments of the invention, methods, apparatuses, systems and computer program products are provided for enabling an automated manner in which to retrieve software artifacts from a network entity (e.g., network device 150) or the like and move the artifacts along one or more environments for deploying software that may be accessible by one or more devices (e.g., electronic devices 100). Additionally, the exemplary embodiments may enable provision of display of data associated with one or more application logs corresponding to a particular application(s) (e.g., software code) in response to receipt of a selection of a configured project and/or environment where the application or software code may be deployed. The data that may be displayed associated with the application log may be lines of text of the respective application logs. Moreover, exemplary embodiments may enable provision of a user interface (e.g., a graphical user interface) that may display projects and their configured environment(s), versions of software that have been deployed, the status of the deployments within environments and other information relevant to deploying software. In this regard, the exemplary embodiments may provide a user interface that enables display of information associated with deployed software that a user(s) may access in a reliable, efficient and user-friendly manner.

The exemplary embodiments may automate the process of deploying or promoting software within one or more environments in an efficient, reliable and simple manner that may be utilized by one or more different users that may be involved in the process of facilitating deployment of the software.

General System Architecture

Reference is now made to FIG. 1, which is a block diagram of a system according to exemplary embodiments. As shown in FIG. 1, the system may include one or more electronic devices 100 (e.g., personal computers, laptops, workstations, personal digital assistants and the like, etc.) which may access one or more network entities such as for example a communication device 145 (e.g., a server), or any other similar network entity, over a network 140, such as a wired local area network (LAN) or a wireless local area network (WLAN), a metropolitan network (MAN) and/or a wide area network (WAN) (e.g., the Internet). In this regard, the communication device 145 is capable of receiving data from and transmitting data to the electronic devices 100 via network 140.

Similarly, the communication device 145 may communicate with a network entity such as for example network device 150 (also referred to herein as server 150, build server 150 or integration server 150), network device 175 (also referred to herein as server 175, build server 175 or integration server 175) or any other suitable network entity via network 170. In this regard, the communication device 145 may receive data from and transmit data to the network device 150 and network device 175. The network 170 may be a wired or wireless local area network (LAN), a metropolitan network (MAN) and/or a wide area network (WAN) (e.g., the Internet). The network device 150 and the network device 175 may build software code for deployment within one or more environments. The software code built by the network device 150 may be sent to the communication device 145 upon receipt of a request from the communication device 145. Additionally, the network device 150 and/or network device 175 may include one or more memories (e.g., database repositories) that may store source code. It should be pointed out that although FIG. 1 shows four electronic devices 100, one communication device 145, one network device 150 and one network device 175 that any suitable number of electronic devices 100, communications devices 145, network devices 150 and network devices 175 may be part of the system of FIG. 1 without departing from the spirit and scope of the invention.

Communication Device

FIG. 2 illustrates a block diagram of a communication device according to an exemplary embodiment of the invention. The communication device 145 may, but need not, be a network entity such as for example, a server. The communication device 145 includes various means for performing one or more functions in accordance with exemplary embodiments of the invention, including those more particularly shown and described herein. It should be understood, however, that one or more of the communication devices may include alternative means for performing one or more like functions, without departing from the spirit and scope of the invention. More particularly, for example, as shown in FIG. 2, the communication device may include a processor 70 connected to a memory 86. The memory may comprise volatile and/or non-volatile memory, and typically stores content (media content), data, information or the like.

For example, the memory may store content transmitted from, and/or received by, the computing device. In an exemplary embodiment, the memory 86 may store one or more applications, software, software code, artifacts or the like as well as any other suitable information. The memory 86 may also store one or more usernames and passwords for accessing one or more devices or services provided by a device (e.g., communication device 145) and authenticating one or users as well as information associated with one or more rights of users for accessing certain information, as described more fully below.

Also for example, the memory 86 typically stores client applications, instructions or the like for execution by the processor 70 to perform steps associated with operation of the communication device in accordance with embodiments of the invention. As explained below, for example, the memory 86 may store one or more client application(s) such as for example software (e.g., computer code).

The processor 70 may be embodied in a variety of ways. For instance, the processor 70 may be embodied as a controller, coprocessor microprocessor of other processing devices including integrated circuits such as for example an application specific integrated circuit (ASIC), a field programmable gate array (FPGA). In an exemplary embodiment, the processor may execute instructions stored in the memory 86 or otherwise accessible to the processor 70.

The communication device 145 may include one or more logic elements for performing various functions of one or more client application(s). In an exemplary embodiment, the communication device 145 may execute the client application(s). The logic elements performing the functions of one or more client applications may be embodied in an integrated circuit assembly including one or more integrated circuits (e.g., an ASIC, FPGA or the like) integral or otherwise in communication with a respective network entity (e.g., computing system, client, server, etc.) or more particularly, for example, a processor 70 of the respective network entity.

In addition to the memory 86, the processor 70 may also be connected to at least one interface or other means for displaying, transmitting and/or receiving data, content or the like. The interface(s) can include at least one communication interface 88 or other means for transmitting and/or receiving data, content or the like. In this regard, the communication interface 88 may include, for example, an antenna and supporting hardware and/or software for enabling communications with a wireless communication network. For example, the communication interface(s) may include a first communication interface for connecting to a first network, and a second communication interface for connecting to a second network. In this regard, the computing device is capable of communicating with other electronic devices (e.g., electronic devices 100 and server 150) over one or more networks (e.g., networks 140 and 170) such as a Local Area Network (LAN), wireless LAN (WLAN), Wide Area Network (WAN), Wireless Wide Area Network (WWAN), the Internet, or the like. Alternatively, the communication interface can support a wired connection with the respective network.

In addition to the communication interface(s), the interface(s) may also include at least one user interface that may include one or more earphones and/or speakers, a display 80, and/or a user input interface 82. The user input interface, in turn, may comprise any of a number of devices allowing the entity to receive data from a user, such as a microphone, a keypad, keyboard, a touch display, a joystick, image capture device, pointing device (e.g., mouse), stylus or other input device.

In an exemplary embodiment, the processor 70 may be in communication with and may otherwise control a central project deployment (CPD) module manager 78. The CPD module 78 may be any means such as a device or circuitry operating in accordance with software or otherwise embodied in hardware or a combination of hardware and software thereby configuring the device or circuitry (e.g. a processor or controller) to perform the corresponding functions of the CPD module 78 as described below. In examples in which software is employed, a device or circuitry (e.g., processor 70 in one example) executing the software forms the structure associated with such means. As such, for example, the CPD module 78 may be configured to provide among other things, for automating the process of deploying software within one or more environments, as described more fully below.

Computing Device

Referring now to FIG. 3, a block diagram of a computing device according to an exemplary embodiment is provided. The computing device is capable of operating as network device 150, network device 175 or any of electronic devices 100. In this regard, the network device 150, network device 175 and electronic devices 100 may comprise the elements of the computing device of FIG. 3. As shown in FIG. 3, the computing device may include a processor 34 connected to a memory device 36. The memory device 36 (also referred to herein as memory 36) may comprise volatile and/or non-volatile memory, and may store content, information, data or the like. For example, the memory device 36 typically stores content transmitted from, and/or received by, the computing device. Additionally, the memory device 36 may store client applications, software, software code (e.g., computer code), artifacts, algorithms, instructions or the like for the processor 34 to perform steps associated with operation of the computing device.

The processor 34 may be connected to at least one communication interface 38 or other means for displaying, transmitting and/or receiving data, content, information or the like. In this regard, the communication interface 38 may be capable of connecting to one or more networks. The computing device may also include at least one user input interface 32 that may include one or more speakers, a display 30, and/or any other suitable devices. For instance, the user input interface 32 may include any of a number of devices allowing the computing device to receive data from a user, such as a keyboard, a keypad, mouse, a microphone, a touch screen display, or any other input device.

Exemplary System Operation

Reference will now be made to FIGS. 4-9, which show user interfaces for generating and managing resources for deploying software within environments. In particular, FIGS. 4-9 are diagrams of user interfaces that may be utilized for (a) editing and creating connections with devices, (b) setting up of different devices for connection, (c) setting up of projects and environments, (c) creating or editing rights of users and assigning users to groups and, (d) editing or adding projects for evaluation according to an exemplary embodiment of the invention.

a. Configuring Resources within a System of an Example Embodiment

Referring now to FIG. 4, an exemplary embodiment of a diagram of a user interface for creating a connection(s) to a device(s) is provided. The user interface 3 may be generated by the CPD module 78 of the communication device 145. It should be pointed out that certain users may have access to the user interface 3 while other uses may not have access. In the example embodiment of FIG. 4, one or more administrators (e.g., an administrator named Marc Avent) may have rights to access and utilize the user interface 3. By providing the user interface 3, the CPD module 78 may enable an administrator(s) to make selections via the user interface 3 to edit and/or create connections to one or more devices (e.g., servers) that may build software for deployment. In response to receipt of the selection(s), the CPD module 78 may be configured to connect to the device(s) selected or specified by the administrator(s). In the example embodiment of FIG. 4, the device (e.g., build server 150) specified or selected by the administration may be named Build Server 1 and may be hosted by an entity such as for example McKesson™. The device (e.g., build server 150) may be configured to build software for deployment. The user interface 3 may also enable an administrator(s) to facilitate setup of communication with a device (e.g., server 175) having a memory (e.g., memory 36) with a repository database that may store source code.

Referring now to FIG. 5, an exemplary embodiment of a diagram of a user interface for enabling setup of devices that the CPD module 78 may connect to is provided. In this regard, the CPD module 78 may generate the user interface 5 which may allow a user(s) such as, for example, an administrator to setup one or more different servers (e.g., server 150, server 175) that the CPD module 78 may communicate with. In the example embodiment of FIG. 5, the user interface 5 may enable display of the hostname, username and password stored in a memory (e.g. memory 86) of the communication device 145 that may be used by the CPD module 78 in promoting software code between environments.

Referring now to FIG. 6, an exemplary embodiment of diagram of a user interface for enabling setup of one or more projects and environments is provided. The environments may include, but are not limited to development (DEV), quality assurance (QA), production (PROD), integration (INTEG) and any other suitable environments in which software code may be promoted. The user interface 7 may be generated by the CPD module 78 and may enable users (e.g., administrators) to specify different types of project types (e.g., Tibco, file copy, shell script, another neat tool (ant) build, move and execute) for display. Additionally, the user interface 7 may enable display of one or more change windows that may be utilized to enable the CPD module 78 to ensure that changes to software code are promoted to their respective environment only during predefined times specified by a change window (s) (e.g., between the hours of 6:00 AM-8:00 AM on a given day). Additionally, one or more hosts (e.g., servers) that may be utilized for a particular environment(s) may also be displayed by the user interface 7.

Referring now to FIG. 7, an exemplary embodiment of a diagram of a user interface for assigning rights to users is provided. The user interface 9 generated by the CPD module 78, may be utilized by an administrator(s) or the like to create and/or edit one or more rights assigned to users. The CPD module 78 may enable the users with the assigned rights to access to the system of FIG. 1 and in this regard the users may be able to utilize the communication device 145 that may facilitate deployment of software. Additionally, the user interface 9 may enable an administrator or the like to specify an email address(es) or an instant messaging address(es) associated with a user(s) that is assigned rights. The user interface 9 may also be provided with one or more override change windows that may enable the CPD module 78 to allow certain users with particular rights (e.g., administrative rights, managerial rights, etc.) the ability to override the defined change window when a displayed prompt is generated by the CPD module 78, asking the user to confirm the override of the defined change window. This prompt may be shown on a display (e.g., display 30) of an electronic device 100 that may be utilized by the respective user. Upon receipt of a selection by the user confirming the override of the defined change window, the CPD module 78 may enable the user to make changes even during the time period corresponding to the defined change window. Selection of the read only tab of the user interface 9 may cause respective users to have read only rights which may enable the CPD module to allow the respective users to view one or more projects while preventing these users from promoting software or making any changes.

Referring now to FIG. 8, an exemplary embodiment of a diagram of a user interface for enabling users to edit or add projects associated with deploying software is provided. In this regard, users may utilize the user interface 11, generated by the CPD module 78, to select one or more devices (e.g., network device 150) such as, for example, a server that may build software code (e.g., artifacts). The user interface 11 may also include one or more artifact directories relating to information indicating locations of artifacts. Additionally, the user interface 11 may identify one or more types (e.g., Tibco, etc.) of projects for selection. Users may also utilize the user interface 11 to specify a repository location(s) that may be used for integration with source code repositories. The user interface 11 may also specify a deployment order in which software may be deployed between one or more environments. For instance, in the example embodiment of FIG. 8, the user interface 11 may specify a deployment order of development (Dev), quality assurance (QA) and integration (INTEG).

Referring now to FIG. 9, an exemplary embodiment of a diagram of a user interface for enabling control of user access to the system of FIG. 1 is provided. In the example embodiment of FIG. 9, the user interface 12, generated by the CPD module 78, may enable users to be added to a group (e.g., a group named "Galileo") which may be associated with certain rights. Additionally, the user interface 12 may enable selection of one or more environments and/or projects that the users of the group may be authorized to access.

b. Application Log Retrievals

During the process of deploying software, it should be pointed out that it may be beneficial to refer to or analyze one or more application logs associated with software being deployed since the application logs may keep track of relevant information associated with the deployment process. For instance, application logs may include information associated with trouble shooting software code or identification of problems or errors (e.g., software bugs) that may have occurred during deployment of software code. Typically, application logs may be stored on different servers utilized by different environments (e.g., a development environment, a production environment) and may be associated with different projects. At present, since application logs may be stored in different servers and may be associated with different environments and projects it may be difficult to retrieve and access application logs in an efficient and reliable manner. For example, currently application logs may need to be retrieved in a manual manner by a user utilizing a device to communicate with different servers in which the user believes one or more corresponding application logs may be stored. However, if the user's belief is incorrect, the user may need to utilize the device to initiate communications with another server to find application logs of interest. Moreover, various command windows may need to be utilized by a user to facilitate communications to the different servers storing the application logs. Accessing the servers storing the application logs using various command windows may be time consuming and inefficient.

According to an example embodiment, the CPD module 78 may overcome the foregoing drawbacks associated with accessing application logs. For example, the CPD module 78 may configure or associate application logs (also referred to herein as log files) per each environment and/or each project so that application logs may be automatically retrieved from respective devices (e.g., servers) based on a selection of one or more corresponding environments and/or projects, as described more fully below with reference to FIGS. 10-14.

Reference will now be made to FIGS. 10-14, which show user interfaces for configuring and retrieving one or more application logs according to an exemplary embodiment. In this regard, the CPD module 78 may generate one or more user interfaces that may enable users to select a configured project(s) and/or environment(s) where the software has been deployed. Users may utilize the user interfaces to select a configured application log(s) and retrieve one or more lines of text from the application log(s) for display. The number of lines of text may, but need not, be specified by the user. It should be pointed out that multiple application logs may be configured by the CPD module 78 for a project(s).

Referring now to FIG. 10, an exemplary embodiment of a user interface for enabling selection of configured projects and environments where software may have been deployed for retrieval of one or more application logs is provided. In the example embodiment of FIG. 10, the user interface 14 may be accessible by a user(s) with administrative rights but may be inaccessible by other users. The CPD module 78 may determine the applicable rights of a user(s) in response to a user logging into the communication device 145. A user(s) may login to the communication device 145 by inputting a username and password into a prompt generated by the CPD module 78 that may be provided to a display (e.g., display 80) of the communication device 145. In this regard, the CPD module 78 may analyze data stored in memory 86 indicating the rights, if any, of the respective user(s) based on data associated with the username and password of the user(s).

In the example embodiment of FIG. 10, a user with administrative rights may select a tab, folder 2 (also referred to herein as Admin—Projects folder 2) or the like of the user interface 14 associated with administrative projects (also referred to herein as Admin—Projects). In response to receipt of the selection, the CPD module 78 may enable display of projects associated with the Admin—Projects folder 2. As such, a user may select one or more of the projects for retrieval of one or more application logs associated with the selected project(s). In the example of FIG. 10, a user may select the project 4 named Galileo—Payor Search Criteria and may then select the configure logs button 6 (also referred to herein as Config Logs button 6) which may cause the CPD module 78 to retrieve one or more application logs associated with the selected project 4.

Referring now to FIG. 11, an exemplary embodiment of a user interface for enabling display of one or more application logs associated with an environment and/or project is provided. The CPD module 78 may generate the user interface 15 in response to receipt of the selection of the project 4 when a user selects the Config Logs button 6. Additionally, it should be pointed out that a user may need administrative rights to access the user interface 15. The CPD module 78 may enable display of application logs 8 (also referred to herein as project logs 8) corresponding to project 4. A user may select an application log 10 which may be configured in the development (DEV) environment. The corresponding host name 16 and log name 18 associated with the selected application log 10 may also be determined by the CPD module 78 and displayed via the user interface 15. The host name may be associated with a network device (e.g., network device 150) such as, for example, a server where the application log(s) 10 may be stored. The CPD module 78 may determine the host name 16 and log name 18 corresponding to the selected application log 10 by analyzing information stored in the memory 86 of the communication device 145.

Additionally, the CPD module 78 may enable the user interface 15 to show an environment name field 20 associated with data identifying the names of application logs (e.g., application log 10) and the environment(s) (e.g., development environment) that the application logs were previously or currently being configured within. The CPD module 78 may also enable the user interface 15 to show a host name field 22 that may be associated with indicia denoting the names of one or more hosts (e.g., a server(s)) that may deploy software associated with one or more application logs within a particular environment(s). As shown in FIG. 11, the environment name field 20 may indicate that the application log 10 is selected and may indicate the corresponding name 16 of the host (e.g., server) that stores the application log 10.

It should be pointed out that a user with administrative rights (also referred to herein as an administrator), for example, may change a host (e.g., server (e.g., server 150)) currently storing an application log by selecting another host name 24 from the host name field 22. The host name 24 may correspond to another host (e.g., server 175). In this regard, data associated with the respective application log (e.g., application log 10) may be stored by the host (e.g., server 175) associated with the selected host name 24. The CPD module 78 may also enable the user interface 15 to display a log path 21 associated with a selected application log 10 and a log display name 23 associated with the selected application log 10. In one example embodiment, the text entered in the text box 25 associated with the log display name 23 may be entered by an administrator, for example, and may be utilized by the CPD module 78 to enable display of a name of an application log corresponding to the name in the text box 25. For instance, when a user other than the administrator accesses the user interface 15 and selects an application log corresponding to the application log named by the administrator, the CPD module 78 may enable the user interface to display the name of the corresponding log as assigned by the administrator.

Referring now to FIG. 12, a diagram of a user interface illustrating deployments of software code in an environment(s) is provided. The user interface 28 may be generated by the CPD module 78. The CPD module 78 may receive software code that may be built by a device such as, for example, a server (e.g., network device 150). The software code received by the CPD module 78 may be deployed or promoted in one or more environments such as, for example, development, quality assurance, integration and/or production environments. As described more fully below, the received software code may be tested by the CPD module 78 in each of the environments.

In the example embodiment of FIG. 12, the CPD module 78 may receive an indication of a selection of a tab 30 (also referred to herein as the Galileo Tibco—DEV tab 30) associated with software code that was deployed within the development environment for a given project 29 (also referred to herein as Galileo project 29, or Galileo—Payor Search Criteria project 29. In this regard, the CPD module 78 may analyze the memory 86 for data indicating deployments of software code within the development environment for the Galileo project. In response to detecting data in the memory 86 indicating deployments in the development environment for the Galileo 29 project, the CPD module 78 may include visible indicia in the user interface 28 indicating deployments associated with the Build Name field 31. In this regard, the CPD module 78 may enable display of one or more versions (e.g., versions 33, 35) corresponding to the deployments of the software code.

The CPD module 78 may also enable display of a username(s) 39 (also referred to herein as deployment user 39) that may have been responsible for initiating the process of generating a respective deployment of software code. For instance, in this example, the CPD module 78 may analyze data in memory 86 and determine that a user with the username "eeh7uf2" initiated the process of generating deployments in the development environment for the Galileo 29 project. The CPD module 78 may enable display of the date 41 (also referred to herein as deployment date 41) and time (e.g., Aug. 5, 2010 at 7:24 AM) that respective deployments occurred as well as the duration of a deployment 43 (also referred to herein as deployment duration (durat) 43). The CPD module 78 may determine the date and time as well as the duration that respective deployments occurred based, in part, on data in the memory 86.

The CPD module 78 may also enable display of data indicating the status 37 of a respective deployment(s). For instance, the CPD module 78 may enable the user interface 28 to display whether a deployment is complete or incomplete based in part on analyzing data in the memory 86. By analyzing data in the memory 86, the CPD module 78 may also enable display of data indicating whether a respective deployment of software code was tested 45 and/or approved 47. The test of the deployment may be performed by the CPD module 78. In the example embodiment of FIG. 12, the CPD module 78 determined that the respective deployments were not (as denoted by the letter "N" (e.g., element 53) tested. It should be pointed out that the CPD module 78 may enable display indicating whether a respective deployment is approved in response to receipt of a selection of the approve button 115 by a user indicating approval of the respective deployment. Selection of the approve button 115, may enable the CPD module 78 to approve a deployment of software code for an environment and may enable the CPD module 78 to automatically deploy the software code within a next environment specified by a deployment order. In the example of FIG. 12, the CPD module 78 determined that version 33 of a deployment was not approved as denoted by the letter "N" (e.g., element 49). On the other hand, the CPD module 78 determined that version 35 of a deployment was approved as denoted by letter "Y" (e.g., element 51).

Additionally, in response to a user utilizing a pointing device (e.g., mouse) or the like of the user input interface 82 to hover over indicia associated with whether deployments of software code were tested 45 and/or approved 47, the CPD module 78 may enable display of additional data. For purposes of illustration and not of limitation, when the user utilizes a pointing device or the like to hover over element 49 the CPD module 78 may enable display of visible indicia indicating why a particular deployment of the software code was not approved. Additionally, when the user utilizes a pointing device or the like to hover over element 51, the CPD module 78 may enable display of visible indicia indicating why a particular deployment of the software code was approved.

In response to receipt of a selection of the application logs button 55, the CPD module 78 may enable display of one or more application logs associated with a project (e.g., Galileo 29) being utilized within a given environment (e.g., development environment), as described more fully below with respect to FIG. 13.

Referring now to FIG. 13, an exemplary embodiment of a diagram of a user interface for retrieving one or more application logs associated with a project and environment(s) is provided. The CPD module 78 generated the user interface 42. The CPD module 78 may generate the user interface 42 in response to receipt of a selection of the application logs button 55. For purposes of illustration and not of limitation, in the example embodiment of FIG. 13, the CPD module 78 may determine that there is one application log corresponding to the deployments of software code in the development environment for Galileo project 29 in response to receipt of the selection of the application logs button 55. In this regard, the CPD module 78 may include the application log 44 in a pull down menu 46 or the like and when the application log 44 is selected by the user in the pull down menu 46, the user may utilize the user input interface 42 to input a number (e.g., 100) of lines that the user would like to retrieve from the application log. In response to receipt of a selection of the retrieve button 49, the CPD module 78 may retrieve the number of lines of the application log requested by the user and may enable display of the lines 63 of the application log 44 requested by the user, as shown in the user interface 61 of FIG. 14.

In an example embodiment, the number of lines for retrieval may be set by the CPD module 78 as a default of 100 lines of an application log(s). Additionally, in an example embodiment, when the CPD module 78 retrieves lines of an application log requested by the user, the CPD module 78 may retrieve the lines beginning at the end of an application log and spanning upwards until the specified number (e.g., 100 lines) of lines is selected for retrieval. In this regard, the CPD module 78 may retrieve the last number of specified lines of an application log. In an alternative embodiment, the CPD module 78 may retrieve lines at the beginning of an application log and spanning downwards until the specified number of lines (e.g., 100 lines) is selected by the CPD module 78 for retrieval. In another alternative exemplary embodiment, the selection of the number of lines for retrieval by the CPD module 78 may begin in any suitable section of the application log irrespective of beginning the selection at the start or the end of an application log.

Although one application log 44 is provided to the pull down menu 46 by the CPD module 78 in the example of FIG. 13, it should be pointed out that any suitable number of application logs may be detected and provided to the pull down menu 46 by the CPD module 78.

c. Automating the Deployment Process

According to an exemplary embodiment of the invention, the CPD module 78 may automate the process of deploying built software code within environments which may provide an easy and efficient manner for users to deploy software code into a particular environment(s). For example, selected software code may be moved between environments in response to receipt of a selection of a button, tab or the like and may be deployed within environments in an efficient and reliable manner, as described more fully below with reference to FIGS. 12, 15, 16, 17, 18A and 18B.

As an example of the manner in which to deploy software between environments according to an exemplary embodiment, consider FIG. 12. In this example, presume that a user selects the tab 65 (also referred to herein as build tab 65). In response to receipt of the selection of the build tab 65, the CPD module 78 may send a request to the network device 150 and/or network device 175 requesting software code that may be built by the network devices 150 and 175. In this regard, the CPD module 78 may enable display of visible indicia (e.g., a graphical representation of an icon(s) or the like) denoting one or more software builds, in response to receipt of the software builds (e.g., artifacts) from one or more of the network devices 150 and 175. The display of the visible indicia denoting the software builds 77 may be provided via a user interface 74 as shown in FIG. 15. As shown in FIG. 15, the CPD module 78 may enable display of data via the user interface 74 indicating file paths 79 associated with respective software builds 77 and the size of files 81 corresponding to the software builds 77, as well as build dates 83 and build times 85 corresponding to the software builds 77.

In response to receipt of a selection of the builds tab 65, the CPD module 78 may generate a prompt that is provided to a display requesting the user to input information in the prompt specifying a project (e.g., Galileo—Payor Search Criteria project 29). In response to receipt of the inputted information specifying the project, the CPD module 78 may request software builds associated with the specified project from the network devices 150 and 175. As such, the CPD module 78 may enable display of the visible indicia denoting one or more software builds (e.g., software builds 77) related to the specified project (e.g., Galileo—Payor Search Criteria project 29). (See e.g., FIG. 15)

In response to receipt of a selection of visible indicia associated with a software build(s) of interest to the user, the CPD module 78 may promote one or more artifacts associated with the software build(s) within an environment(s). In the example embodiments of FIGS. 12 and 15, the CPD module 78 may deploy artifacts (e.g., software code) within environments according to a predetermined order (also referred to herein as deployment order). For purposes of illustration and not of limitation, in the example embodiment of FIG. 12, the CPD module 78 may deploy artifacts in environments according to the following ordered sequence: the first environment may correspond to a development environment; the second environment may correspond to a quality assurance environment; the third environment may correspond to an integration environment; and the fourth environment may correspond to a production environment. While the CPD module 78 may deploy artifacts within the development environment first, the quality assurance environment second, the integration environment third and the production environment fourth, it should be pointed out that the order of deploying to environments may be in any other different ordered sequence without departing from the spirit and scope of the invention.

For purposes of illustration and not of limitation, in response to receipt of a selection of the promote button 89 of FIG. 15, the CPD module 78 may promote or deploy one or more artifacts, in an environment (development environment), associated with a selection of visible indicia corresponding to a most recent software build (e.g., software build 87) for the project 29. The CPD module 78 may promote the artifacts in an environment by installing the artifacts to one or more devices (e.g., communication device 145, network devices 150, 175) that may support the environment. In this regard, the devices supporting the environment may process the software associated with the artifacts.

As shown in FIG. 12, the CPD module 78 may perform a test on artifacts within an environment(s). In this regard, the CPD module 78 may provide visible indicia (e.g., letter "N", e.g., element 53 denoting "NO") to the user interface 28 indicating whether or not the test was performed or whether the test passed. In an instance in which the test passes, the CPD module 78 may generate a prompt that may be provided to a display (e.g., display 80) requesting the user to indicate whether the artifacts are approved. In an exemplary embodiment, in response to receipt of the selection of the approve button 115 indicating that the artifacts are approved, the CPD module 78 may automatically move the artifacts to another environment (e.g., quality assurance environment) in a deployment order. The CPD module 78 may provide visible indicia to the user interface 28 indicating that a promotion of artifacts was approved (e.g., letter "Y", e.g., element 51 denoting "YES") or disapproved (e.g., letter "N", e.g., element 49 denoting "NO") for a given environment(s). In an alternative exemplary embodiment, selection of the approve button 115 may not automatically move the artifacts to another environment. In this alternative exemplary embodiment, selection of the approve button 115 may provide indicia to the CPD module 78 that a user has approved a corresponding artifact(s) for deployment into the next environment. However, in this alternative embodiment, Quality Assurance (QA) personnel may be required to authorize the approval of the artifact once the QA testing is complete and the artifact passes the QA requirements.

It should also be pointed out that the CPD module 78 may generate one or more audit points to keep track of the information detected during deployment of software code within environments. For purposes of illustration and not of limitation, the CPD module 78 may generate one or more audit points in response to receiving an indication that one or more files are being received from the network device 150 or network device 175, information indicating that scripts are being enabled, information indicating that a deployment within an environment has begun, information indicating that a deployment has ended or any other suitable information detected during the process of deploying software.

In response to receipt of a selection of the deploy history button 69, the CPD module 78 may generate a user interface 72 as shown in FIG. 16 and may enable display of the generated audit points. As such, the audit points may be associated with data indicating a brief description of the action(s) 71 associated with the respective audit points and the date and time 68 that the action(s) was performed. In this manner, one or more users may monitor the process of deploying software code by viewing the audit points generated by the CPD module 78 during deployment.

If an issue(s) or problem(s) is encountered during the deployment of software within an environment(s), the CPD module 78 may assign an error status to the deployment of software within an environment. For example, the CPD module 78 may detect problems in instances in which the communication device 145 may be unable to connect to the network device 150 and/or network device 175, in response to detecting that memory space is unavailable or any other suitable problems that may occur during deployment of software code. When the CPD module 78 detects a problem and assigns an error status, the CPD module 78 may provide visible indicia 75, 77 to a user interface (e.g., user interface 73) generated by the CPD module 78 indicating an error status is associated with the deployment within an environment, as shown in the example embodiment of FIG. 17. In one embodiment, the CPD module 78 may provide the visible indicia denoting the error status to the user interface, in response to receipt of a selection of the deploy log tab 62 of FIG. 12. Additionally or alternatively, when the CPD module 78 detects a problem and assigns an error status, the CPD module 78 may stop the deployment and may send a device (e.g., electronic device 100) of a user that may be responsible for initiating the deployment process a notification that an error(s) (also referred to herein as error notification) was detected. The CPD module 78 may send the device (e.g., electronic device 100) of the user an error notification via a communication mechanism such as, for example, an email, an instant message or any other suitable manner.

On the other hand, in an instance in which the CPD module 78 determines that software is successfully deployed within an environment, the CPD module may send a device of the user a message (also referred to herein as completion notification) notifying the user that the deployment was completed successfully within an environment. The completion notification may include information indicating times or time periods of the deployment of the software code within an environment and devices (e.g., communication device 145) that performed the deployment. The CPD module 78 may send the completion notification(s) to a device (e.g., electronic device 100) of the user via a communication mechanism such as email or instant message as well as any other suitable mechanism. Additionally or alternatively, the CPD module 78 may provide visible indicia (e.g., data indicating Completed 84 of FIG. 17) to the user interface 73 denoting that deployments within an environment was successfully completed.

It should be pointed out that after an initial deployment within a first configured environment (e.g. development environment) that the corresponding artifacts may be stored in a memory (e.g., memory 86). As such, when the CPD module 78 deploys the corresponding artifacts within a second configured environment (e.g., quality assurance environment) the CPD module 78 may retrieve the artifacts from the memory for deployment in the second configured environment. This process of retrieving the artifacts from the memory may be repeated by the CPD module 78 for a configured number of environments (e.g., four in the example of FIG. 12) until the artifacts reach a final configured environment (e.g., production environment) in an application lifecycle (e.g., deployment order).

The CPD module 78 may move software code back to a previous environment in response to receipt of a selection of the demote button 60. (See e.g., FIG. 12) For instance, if the software code is being deployed in a second or subsequent environment (e.g., production environment), the CPD module 78 may demote the software code to a previous environment (e.g., integration environment) in response to receipt of a selection of the demote button 60. As an example, the CPD module 78 may demote the software code to a previous environment in response to receipt of a selection of the demote button 60 in an instance in which the user desires to troubleshoot the software code in the prior environment. Additionally, the CPD module 78 may redeploy software code within an environment in response to receipt of a selection of the repromote button 64. For example, selection of the repromote button 64 may enable the CPD module 78 to repromote an artifact(s) that was previously deployed within the same environment. In an exemplary embodiment, a user may select an artifact(s) that the user desires to redeploy from a list of previously deployed artifacts. For purposes of illustration and not of limitation, a user that encountered an error deploying an artifact(s) within an environment may select a previously deployed artifact from a list corresponding to a particular environment. In this regard, the user may then select the repromote button to enable the CPD module 78 to deploy the selected artifact within the environment again. The redeployed artifact(s) may not have any errors.

The CPD module 78 may allow changes to be made during one or more changes windows which may specify that changes to software code within a particular environment may occur during predetermined time periods (e.g., between 6:00 AM-8:00 AM of a given day) or time windows. In this regard, users may be prevented from deploying software within an environment if a current time (e.g., 9:00 AM) is outside of the change window. In an alternative embodiment, the CPD module 78 may enable changes to be made to software code within an environment even when a current time is outside of the change window, based on the rights (e.g., administrative rights, managerial rights) assigned to the user utilizing the communication device 145. The CPD module 78 may determine the rights of the user based on account information (e.g., username, password) of a user and in an instance in which the CPD module 78 determines that the user has the requisite rights (e.g., administrative rights, managerial rights), the CPD module 78 may generate a prompt that may be provided to the display 80, requesting the user to indicate whether the user wishes to make a change within the environment even though the current time is outside of the change window. If the user inputs data into the prompt indicating a desire to make the change, the CPD module 78 may allow the user to make the change within the environment. Otherwise, the CPD module 78 may prevent any changes from being made during the times outside of the change window.

Referring now to FIGS. 18A and 18B, a flowchart of an exemplary embodiment for deploying software code within an environment is provided. At operation 1800, the CPD module 78 may receive an indication of a selection to deploy software code within an environment(s). The CPD module 78 may receive the indication of the selection in response to detecting that a promote button (e.g., promote button 67, promote button 89) of a user interface (e.g., user interface 28, user interface 74) is selected by a user. At operation 1805, the CPD module 78 may determine whether the user selecting the promote button is authorized to deploy the software code within the environment(s). The CPD module 78 may determine whether the user is authorized to deploy software code within the environment based on analyzing or evaluating data stored in a memory (e.g., memory 86) indicating the rights (e.g., administrative rights, managerial rights, etc.) of the user. At operation 1810, the CPD module 78 may send a message to a device (e.g., electronic device 100) of the user indicting an error, in response to determining that the user is not authorized to deploy the software code within the environment. The message may include data indicating that the user is not authorized to deploy the software code within the environment(s). At operation 1815, the CPD module 78 may determine whether a current time (e.g., 7:00 AM) is within a time period (e.g., 6:00 AM-8:00 AM) associated with a change window in response to determining that the user is authorized to deploy the software code in the environment(s).

At operation 1820, in an instance in which the CPD module 78 determines that the current time is not within a time period associated with a change window, the CPD module 78 may determine whether the user has change window override privileges. The CPD module 78 may determine that the user has change window override privileges based on data associated with rights of the user that may be stored in memory 86. At operation 1825, the CPD module 78 may send a message to a device (e.g., electronic device 100) of the user indicting an error, in response to determining that the user does not have change window override privileges. The message may include data indicating that the user is not authorized to override the change window and is prevented from making any changes to software code within an environment during the time period associated with the change window. At operation 1830, the CPD module 78 may determine whether the software code is stored at a network device (e.g., network device 150 (e.g., a build server)) in response to determining that the current time is within a change window or that the user is authorized to override the change window.

At operation 1835, the CPD module may receive the software code from the network device (e.g., network device 150) in response to determining that the code is stored at the network device. The CPD module 78 may receive the software code from the network device in response to sending the network device a message requesting the software code. At operation 1840, the CPD module 78 may retrieve the software code from a memory (e.g., memory 86) in response to determining that the software code may be stored at the communication device 145.

At operation 1845, the CPD module 78 may determine whether the software code is associated with a file copy. At operation 1850, the CPD module 78 may determine the environment that the software code is to be deployed within in response to the determining that the software code is associated with a file copy. At operation 1855, the CPD module 78 may determine the environment that the software code is to be deployed within in response to determining that the software code is not associated with a file copy and is instead associated with one or scripts. At operation 1860, the CPD module 78 may move the software code associated with the file copy within the defined environment.

At operation 1865, the CPD module 78 may execute the scripts to move the software code within the defined environment(s). At operation 1870, the CPD module 78 may execute a promote command to install the software code to devices (e.g., communication device 145, network device 150 and/or network device 175) that may support the environment. At operation 1875, in response to determining that software code is moved to the respective environment, the CPD module 78 may record or detect deployment information associated with the deploying of the software code within the environment. In this regard, the CPD module 78 may detect data associated with the time the deployment was completed, the current status (e.g., data indicating whether the software code was tested and/or approved) of the deployment, the duration of the deployment, the user initiating the deployment, or any other suitable information.

At operation 1880, the CPD module 78 may store the recorded or detected deployment information in a memory (e.g., memory 86). At operation 1885, the CPD module 78 may determine whether one or more errors were detected during deployment of the software code within the environment. At operation 1890, the CPD module 78 may send a device (e.g., electronic device 100) of the user a message in response to determining that one or more errors occurred during the deployment. The message may include data specifying that an error occurred and may provide details regarding the reason for the error(s) (e.g., unable to establish a connection with devices, software not executing properly, etc.). At operation 1895, the CPD module 78 may send a message to a device of the user indicating that deployment of the software code within the environment is complete in response to determining that no errors occurred during the deployment. The message may be sent via email, an instant message or in any other suitable manner. The message may include data indicating that the deployment was completed successfully.

d. Deployment Dashboard

Referring now to FIGS. 19 and 20, one or more exemplary embodiments for providing user interface dashboards are provided. The user interface dashboards may enable display of information associated with one or more deployments in one or more environments in an efficient and reliable manner. In this regard, one or more users may access the information provided by the user interface dashboards s and may view relevant information at a glance, as described more fully below with reference to FIGS. 19 and 20.

Referring now to FIG. 19, an example embodiment of a user interface dashboard according to an exemplary embodiment is provided. The user interface dashboard 91 may be generated by the CPD module 78. The user interface 91 may indicate one or more projects 92 and their corresponding configured environments (e.g., environments 94, 96, 97 and 98). Additionally, the CPD module 78 may enable display of visible indicia (e.g., the text 99) denoting the software that has been deployed to each of the environments. In the example embodiment of FIG. 19, each of the first configured environments may be displayed in a single column, the second configured environment may be displayed in another column so on and so forth up to the end of the application lifecycle (e.g., through environment 4 in this example). It should be pointed out that each of the projects may not have the same number of configured environments. For instance, some projects may only be deployed within two environments while other projects may be deployed within four environments or any other suitable number of environments.

The CPD module 78 may store the information shown via the user interface dashboard 91 during the deployment within individual environments. In an example embodiment, the CPD module 78 may enable users to view information that they may have access to while restricting users from viewing information that they are unauthorized to view. The CPD module 78 may determine the information that users are able to view based on data that may be stored in memory 86 associated with the rights of users.

In response to a user utilizing a pointing device or the like to hover over information shown via the user interface dashboard 91, the CPD module 78 may enable display of additionally data. For purposes of illustration and not of limitation, in response to receipt of an indication that a pointing device hovers over data shown on the user interface 91, the CPD module 78 may enable display of additional data, including but not limited to, the user that initiated the deployment of the software code, the time in which the software code was deployed, the name of the environment that the software code was deployed within and any other suitable data.

Additionally, the CPD module 78 may associate visible indicia such as, for example, one or more colors with information displayed via the user interface dashboard 91. The visible indicia may be utilized to indicate a status of a deployment. For purposes of illustration and not of limitation, the CPD module 78 may generate visible indicia associated with a color such, as for example, green which may denote that a deployment is complete. Also, the CPD module 78 may generate visible indicia associated with a color such as, for example, red that may denote that the CPD module 78 detected an error during deployment. The CPD module 78 may also generate visible indicia associated with a color such as, for example, blue (e.g., denoted by cross hatching 93) that may denote other information including but not limited to, audit information, a deployment is in process (also referred to herein as promoting now), an incomplete deployment or any other suitable information.

The CPD module 78 may also generate visible indicia associated with other colors that may, but be need not, denote changes within an environment. In this regard, the CPD module 78 may generate visible indicia associated with a color such as for example yellow (e.g., denoted by cross hatching 95) that may indicate that software code has been deployed within the last twenty four hours. The CPD module 78 may also generate visible indicia associated with a color such as, for example, orange (e.g., denoted by cross hatching 103 in FIG. 20) that may indicate that software has been deployed within the last forty eight hours. The visible indicia such as for example, colors generated by the CPD module 78 may be shown via the user interface dashboard 91 as cross hatchings (e.g., cross hatchings 93, 95, 103).

Referring now to FIG. 20, an example embodiment of a user interface dashboard is provided. The CPD module 78 may generate the user interface dashboard 105. The CPD module 78 may enable display of data 107 in response to a detection of a pointing device or the like hovering over data of shown via the user interface dashboard 105. Additionally the data 107 may be associated with visible indicia denoted by cross hatching 103 (e.g., associated with a color such as e.g., orange) indicating the software was deployed within the quality assurance environment within the last forty eight hours. Additionally, the visible indicia denoted by cross hatching 93 (e.g., associated with a color such as e.g., blue) may indicate that software is being currently promoted within an environment(s). The visible indicia denoted by cross hatching 95 (e.g., associated with a color such as e.g., yellow) may denote that software was deployed within an environment within the last twenty four hours.

Referring now to FIG. 21, a flowchart of an exemplary method for deploying software code within one or more environments according to an exemplary embodiment is provided. At operation 2100, the CPD module 78 may receive a selection of software code that may be built by a device. At operation 2105, the CPD module 78 may automatically deploy the software code within a first environment in response to receipt of the selection. At operation 2110, the CPD module 78 may install the software code to one or devices that may support the first environment. In this regard, one or more of the devices may execute the software code within the first environment. Optionally, at operation 2115, the CPD module 78 may test the software code within the environment and may determine whether the test passed.

At operation 2120, the CPD module 78 may deploy the software code to a second environment in response to receipt of an indication that the software code deployed within the first environment is completed and approved. At operation 2125, the CPD module 78 may repeat the deploying of the software code within a number of remaining environments specified in a predetermined deployment order in response to determining that each deployment of the software code within the respective ones of the remaining environments of the deployment order are approved.

It should be pointed out that FIGS. 18A, 18B and 21 are flowcharts of a system, method and computer program product according to exemplary embodiments of the invention. It will be understood that each block or step of the flowcharts, and combinations of blocks in the flowcharts, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory 86, memory 36) and executed by a processor (e.g., processor 70, processor 34, CPD module 78). As will be appreciated, any such computer program instructions may be loaded onto a computer or other programmable apparatus (e.g., hardware) to produce a machine, such that the instructions which execute on the computer or other programmable apparatus cause the functions specified in the flowcharts blocks or steps to be implemented. In some embodiments, the computer program instructions are stored in a computer-readable memory that can direct a computer or other programmable apparatus to function in a particular manner, such that the instructions stored in the computer-readable memory produce an article of manufacture including instructions which implement the function specified in the flowcharts blocks or steps. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts blocks or steps.

Accordingly, blocks or steps of the flowcharts support combinations of means for performing the specified functions and combinations of steps for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In an exemplary embodiment, an apparatus for performing the methods of FIGS. 18A, 18B and 21 above may comprise a processor (e.g., the processor 70, the processor 34) configured to perform some or each of the operations described above. The processor may, for example, be configured to perform the operations by performing hardware implemented logical functions, executing stored instructions, or executing algorithms for performing each of the operations. Alternatively, the apparatus may comprise means for performing each of the operations described above. In this regard, according to an example embodiment, examples of means for performing operations may comprise, for example, the processor 34, the processor 70 (e.g., as means for performing any of the operations described above), the CPD module 78 and/or a device or circuit for executing instructions or executing an algorithm for processing information as described above.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving a first selection of software code built by a device;
   determining whether a current time is within a change window time period configured for implementing changes to the software code in response to determining that a user is authorized to facilitate deployment of items of software code within one or more environments;
   determining whether the user is assigned override privileges to facilitate changes to the software code even in instances in which the current time is determined as not being within the change window time period, and in an instance in which the user is not assigned override privileges, allowing the user to view one or more projects while preventing the user from promoting the software code or making any changes;
   automatically deploying, via a processor, the software code within a first environment in response to receipt of a second selection;
   enabling installation of the software code to one or more devices that support the first environment;
   deploying the software code to a second environment in response to receipt of an indication that the software code deployed within the first environment is completed and approved;
   repeating deployment of the software code within a number of remaining environments specified in a predetermined order in response to determining that each of the deployments of the software code within respective ones of the remaining environments of the order are approved;
   enabling display of one or more projects and respective configured environments arranged sequentially in different columns according to the predetermined order; and
   generating visible indicia denoting one or more statuses of respective deployments within the configured environments.

2. The method of claim 1, wherein automatically deploying comprises moving the software code built by the device to the devices that support the first environment.

3. The method of claim 1, wherein repeating comprises installing the software code to at least one device that supports respective ones of the environments and receiving indications that tests of the software code within each of the respective ones of the environments passed.

4. The method of claim 1, wherein prior to deploying the software code to the second environment, the method further comprises:
testing the software code in the first environment; and
determining whether the test passed.

5. The method of claim 4, further comprising enabling sending of a message to an electronic device of a user indicating at least one error in response to determining that the test failed.

6. The method of claim 1, further comprising enabling display of a portion of an application log generated during a deployment of the software code within a respective environment in response to receipt of a selection.

7. The method of claim 1, further comprising:
generating one or more audit points during a deployment of the software code to enable monitoring of the progress of the deployment at one or more respective times; and
enabling display of one or more actions associated with the audit points and the times.

8. The method of claim 1, further comprising: enabling display of the visible indicia, the visible indicia associated with one or more colors; and enabling display of data in response to receipt of an indication that information displayed on the display is being hovered over, the data is associated with information indicative of at least one deployment of the software code within at least one of the configured environments.

9. An apparatus comprising:
at least one processor; and
at least one memory including computer program code, the at least one memory and the computer program code configured to, with the at least one processor, cause the apparatus to perform at least the following:
receive a first selection of software code built by a device;
determine whether a current time is within a change window time period configured for implementing changes to the software code in response to determining that a user is authorized to facilitate deployment of items of software code within one or more environments;
determine whether the user is assigned override privileges to facilitate changes to the software code even in instances in which the current time is determined as not being within the change window time period, and in an instance in which the user is not assigned override privileges, allowing the user to view one or more projects while preventing the user from promoting the software code or making any changes;
automatically deploy the software code within a first environment in response to receipt of a second selection;
enable installation of the software code to one or more devices that support the first environment;
deploy the software code to a second environment in response to receipt of an indication that the software code deployed within the first environment is completed and approved;
repeat deployment of the software code within a number of remaining environments specified in a predetermined order in response to determining that each of the deployments of the software code within respective ones of the remaining environments of the order are approved;
enable display of one or more projects and respective configured environments arranged sequentially in different columns according to the predetermined order; and
generate visible indicia denoting one or more statuses of respective deployments within the configured environments.

10. The apparatus of claim 9, wherein the memory and the computer program code are configured to, with the processor, cause the apparatus to:
automatically deploy by moving the software code built by the device to the devices that support the first environment.

11. The apparatus of claim 9, wherein the memory and the computer program code are configured to, with the processor, cause the apparatus to:
repeat the deployment by installing the software code to at least one device that supports respective ones of the environments and receiving indications that tests of the software code within each of the respective ones of the environments passed.

12. The apparatus of claim 9, wherein the memory and the computer program code are configured to, with the processor, cause the apparatus to:
test the software code in the first environment; and
determine whether the test passed.

13. The apparatus of claim 12, wherein the memory and the computer program code are configured to, with the processor, cause the apparatus to:
enable sending of a message to an electronic device of a user indicating at least one error in response to determining that the test failed.

14. The apparatus of claim 9, wherein the memory and the computer program code are configured to, with the processor, cause the apparatus to:
enable display of a portion of an application log generated during a deployment of the software code within a respective environment in response to receipt of a selection.

15. The apparatus of claim 9, wherein the memory and the computer program code are configured to, with the processor, cause the apparatus to:
generate one or more audit points during a deployment of the software code to enable monitoring of the progress of the deployment at one or more respective times; and
enable display of one or more actions associated with the audit points and the times.

16. The apparatus of claim 9, wherein the memory and the computer program code are configured to, with the processor, cause the apparatus to:
enable display of the visible indicia, the visible indicia associated with one or more colors; and enable display of data in response to receipt of an indication that information displayed on the display is being hovered over, the data is associated with information indicative of at least one deployment of the software code within at least one of the configured environments.

17. A computer program product comprising at least one non-transitory computer-readable storage medium having computer-executable program code instructions stored therein, the computer executable program code instructions comprising:
program code instructions configured to cause receipt of a first selection of software code built by a device;
program code instructions configured to determine whether a current time is within a change window time period configured for implementing changes to the software code in response to determining that a user is authorized to facilitate deployment of items of software code within one or more environments;
program code instructions configured to determine whether the user is assigned override privileges to facilitate changes to the software code even in instances in which the current time is determined as not being within the change window time period, and in an instance in which the user is not assigned override privileges, allowing the user to view one or more projects while preventing the user from promoting the software code or making any changes;

program code instructions configured to automatically deploy the software code within a first environment in response to receipt of a second selection;

program code instructions configured to enable installation of the software code to one or more devices that support the first environment;

program code instructions configured to deploy the software code to a second environment in response to receipt of an indication that the software code deployed within the first environment is completed and approved;

program code instructions configured to repeat deployment of the software code within a number of remaining environments specified in a predetermined order in response to determining that each of the deployments of the software code within respective ones of the remaining environments of the order are approved;

program code instructions configured to enable display of one or more projects and respective configured environments arranged sequentially in different columns according to the predetermined order; and program code instructions configured to generate visible indicia denoting one or more statuses of respective deployments within the configured environments.

18. The computer program product of claim 17, further comprising:

program code instructions configured to automatically deploy by moving the software code built by the device to the devices that support the first environment.

* * * * *